US010330875B2

(12) United States Patent
Fini et al.

(10) Patent No.: US 10,330,875 B2
(45) Date of Patent: Jun. 25, 2019

(54) OPTICAL MODULE AND ASSOCIATED METHODS

(71) Applicant: Ayar Labs, Inc., Emeryville, CA (US)

(72) Inventors: John Fini, Berkeley, CA (US); Roy Edward Meade, Boise, ID (US); Mark Wade, Berkeley, CA (US); Chen Sun, Berkeley, CA (US); Vladimir Stojanovic, Berkeley, CA (US); Alexandra Wright, San Francisco, CA (US)

(73) Assignee: Ayar Labs, Inc., Emeryville, CA (US)

( * ) Notice: Subject to any disclaimer, the term of this patent is extended or adjusted under 35 U.S.C. 154(b) by 0 days.

(21) Appl. No.: 15/886,822

(22) Filed: Feb. 1, 2018

(65) Prior Publication Data

US 2018/0217344 A1    Aug. 2, 2018

Related U.S. Application Data

(60) Provisional application No. 62/453,457, filed on Feb. 1, 2017.

(51) Int. Cl.
*G02B 6/43*  (2006.01)
*G02B 6/42*  (2006.01)
*H04B 10/80*  (2013.01)
*H04B 10/40*  (2013.01)

(52) U.S. Cl.
CPC ............ *G02B 6/43* (2013.01); *G02B 6/4216* (2013.01); *H04B 10/801* (2013.01); *H04B 10/40* (2013.01)

(58) Field of Classification Search
CPC .................................................. G02B 6/4216
See application file for complete search history.

(56) References Cited

U.S. PATENT DOCUMENTS

| | | | | |
|---|---|---|---|---|
| 2011/0305414 A1* | 12/2011 | Mekis | ..................... | G02F 1/313 385/3 |
| 2016/0103286 A1* | 4/2016 | Matsui | ................. | G02B 6/3812 398/139 |
| 2017/0082801 A1* | 3/2017 | Welch | ................ | G02B 6/12004 |
| 2018/0109348 A1* | 4/2018 | Salsi | ............... | H04B 10/07955 |

* cited by examiner

*Primary Examiner* — Sung H Pak
(74) *Attorney, Agent, or Firm* — Penilla IP, APC

(57) ABSTRACT

An optical module includes a laser light supply system and a chip disposed within a housing. The chip includes a laser input optical port and a transmit data optical port and a receive data optical port. The optical module includes a link-fiber interface exposed at an exterior surface of the housing. The link-fiber interface includes a transmit data connector and a receive data connector. The optical module includes a polarization-maintaining optical fiber connected between a laser output optical port of the laser light supply system and the laser input optical port of the chip. The optical module includes a first non-polarization-maintaining optical fiber connected between the transmit data optical port of the chip and the transmit data connector of the link-fiber interface. The optical module includes a second non-polarization-maintaining optical fiber connected between the receive data optical port of the chip and the receive data connector of the link-fiber interface.

24 Claims, 14 Drawing Sheets

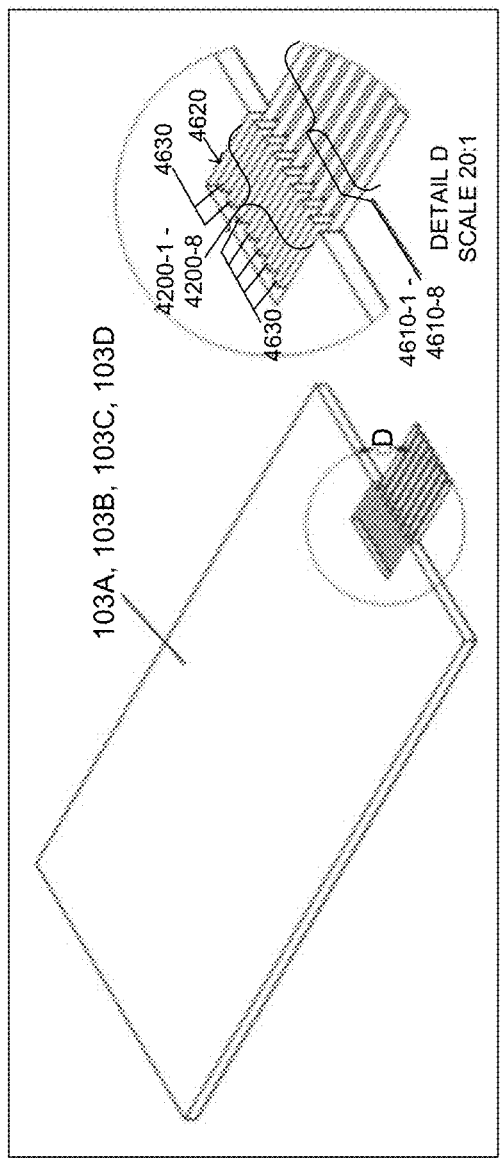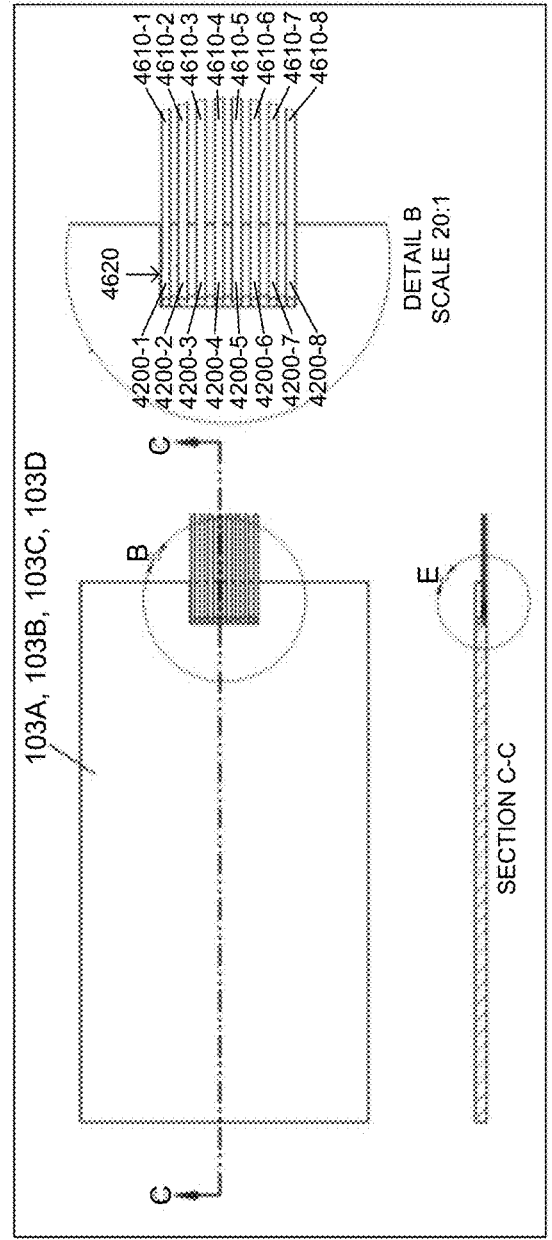

View A-A

View B-B

View C-C

View D-D

- If the helix has radius R and period Λ, it's curvature is $$\kappa = \frac{R}{\left(R^2 + \left(\frac{\Lambda}{2\pi}\right)^2\right)}$$

OPTICAL MODULE AND ASSOCIATED METHODS

CLAIM OF PRIORITY

This application claims priority under 35 U.S.C. 119(e) to U.S. Provisional Patent Application No. 62/453,457, filed Feb. 1, 2017, the disclosure of which is incorporated herein by reference in its entirety for all purposes.

BACKGROUND

1. Field of the Invention

The present invention relates to optical data communication.

2. Description of the Related Art

Optical data communication systems operate by modulating laser light to encode digital data patterns. The modulated laser light is transmitted through an optical data network from a sending node to a receiving node. The modulated laser light having arrived at the receiving node is de-modulated to obtain the original digital data patterns. Therefore, implementation and operation of optical data communication systems is dependent upon having reliable and efficient mechanisms for transmitting laser light and detecting laser light at different nodes within the optical data network. In this regard, it can be necessary to transmit laser light from a laser to a chip, and transmit modulated light from a chip to another chip. It is within this context that the present invention arises.

SUMMARY

In an example embodiment, an optical module includes a housing that includes a laser light supply system and a chip. The laser light supply system includes a laser output optical port. The chip is includes a laser input optical port and a transmit data optical port and a receive data optical port. The optical module also includes a link-fiber interface exposed at an exterior surface of the housing. The link-fiber interface includes a transmit data connector and a receive data connector. The optical module also includes a polarization-maintaining optical fiber optically connected between the laser output optical port and the laser input optical port of the chip. The optical module also includes a first non-polarization-maintaining optical fiber optically connected between the transmit data optical port of the chip and the transmit data connector of the link-fiber interface. The optical module also includes a second non-polarization-maintaining optical fiber optically connected between the receive data optical port of the chip and the receive data connector of the link-fiber interface.

BRIEF DESCRIPTION OF THE DRAWINGS

FIG. 4C shows an interface of eight instances of the lens assembly with the chip, in accordance with an example embodiment of the present invention.

FIG. 4D shows a top-down view of the chip of FIG. 4C, in accordance with some embodiments of the present invention.

DETAILED DESCRIPTION

In the following description, numerous specific details are set forth in order to provide an understanding of the present invention. It will be apparent, however, to one skilled in the art that the present invention may be practiced without some or all of these specific details. In other instances, well known process operations have not been described in detail in order not to unnecessarily obscure the present invention.

Figure 1:
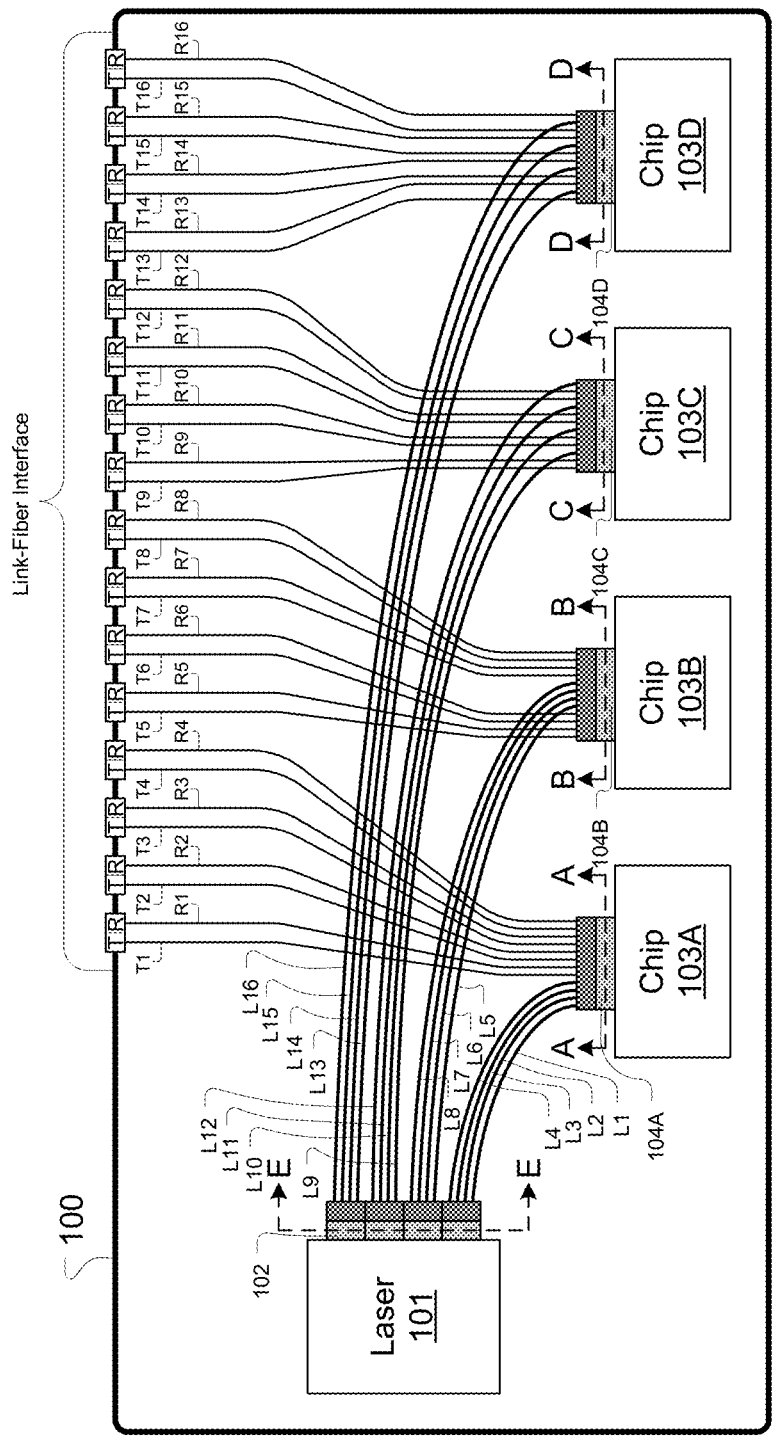
FIG. 1 shows a diagram of an optical module for use in a data communication system, in accordance with some embodiments.

FIG. 1 shows a diagram of an optical module 100 for use in a data communication system, in accordance with some embodiments. In some embodiments, the optical module 100 can have an exterior housing surrounding an interior volume, where the exterior housing is configured to protect components installed within the interior volume. Also, in various embodiments the exterior housing of the optical module 100 can include vents to enable cooling air flow through the interior volume. And, in some embodiments, the optical module 100 can be equipped with forced air cooling, such as fan, to push or draw air through the interior volume of the exterior housing. In some embodiments, the exterior housing of the optical module 100 can be configured as a box. However, in various embodiments, the exterior housing of the optical module 100 can have essentially any size and shape that enables installation of required components within the interior volume of the exterior housing.

In some embodiments, the optical module 100 includes a laser light supply system 101. The laser light supply system 101 is configured to produce and transmit N different wavelengths of light ($\lambda_1$ to $\lambda_N$) collectively at each of multiple laser outputs within an output interface 102. It should be understood that the laser light supply system 101 can include multiple lasers, perhaps one laser per wavelength of light, and can include an arrangement of optical amplifiers, optical splitters, and optical combiners as needed to produce and collectively output the N different wavelengths of light ($\lambda_1$ to $\lambda_N$) at each of multiple laser outputs within the output interface 102. An example laser light supply system 101 is described in co-pending U.S. patent application Ser. No. 15/277,968, which is incorporated herein by reference in its entirety. In some embodiments, the laser light supply system 101 is installed on a printed circuit board, with the printed circuit board installed within the optical module 100.

The optical module 100 also includes a number of chips 103A, 103B, 103C, 103D, where each chip 103A-103D is an integrated photonic chip. In various embodiments, any of the chips 103A-103D can include various devices, such as optical, electrical, electro optic, and combinations thereof. In some embodiments, the chips 103A-103D are transponder chips. In some embodiments, any of the chips 103A-103D can include Si, GaAs, InP, InGaAsP, Ge, GaN, etc. In some embodiments, any of the chips 103A-103D can be a CMOS chip. In some embodiments, any of the chips 103A-103D can have both CMOS circuits and optical circuits. In these embodiments, any of the chips 103A-103D can include custom logic, CPUs, GP-GPUs, switch logic, DRAM, NAND, 3D XPoint, or any other logic, analog, or memory element. Also, in some embodiments, the any of the chips 103A-103D can include one or more vertical grating couplers to enable optical connection with one or more external optical fibers. In some embodiments, the chips 103A-103D are transceiver chips that function to provide an optical communication link over link-fiber within an optical data communication network. As mentioned above, any chip 103A-103D configured as a transceiver chip can also have other integrated functions and perform computations, memory storage, and essentially any other function normally associated with a computer chip.

In the example of FIG. 1, the optical module 100 includes four separate chips 103A-103D. However, it should be understood that in various embodiments, the optical module 100 can include either less than four chips or more than four chips. It should be understood that increasing the number of chips within the optical module 100 provides for leveraging of the cost of the laser light supply system 101 over more data communication interfaces, which reduces the cost of the laser light supply system 101 per data communication interface. In some embodiments, the chips 103A-103D are installed on one or more printed circuit boards, with the printed circuit boards installed within the optical module 100. In some embodiments, the laser light supply system 101 is installed on a printed circuit board that is separate from printed circuit board(s) on which the chips 103A-103D are installed.

The optical module 100 also includes a link-fiber interface exposed on a surface of the exterior housing of the optical module 100, such as on a front panel of the optical module 100 by way of example. The link-fiber interface is configured to provide optical connections between the chips 103A-103D and link-fiber within an optical data communication network, where the link-fiber is the medium of communications. The link-fiber interface includes a number of transmit/receive optical fiber connectors, such as LC duplex connectors. It should be understood that in various embodiments, the link-fiber interface can be configured using essentially any type of optical fiber connector(s). For example, in various embodiments, the transmit and receive optical fiber connectors can be LC, FC, SC, or whatever connector type is desired. In the example of FIG. 1, the link-fiber interface includes sixteen transmit/receive optical fiber connectors, where each transmit optical connector is designated T and each receive optical connector is designated R. It should be understood that in various embodiments, the number of transmit/receive optical fiber connectors in the link-fiber interface is dependent upon the number and configuration of chips, e.g., 103A-103D, within the optical module 100. In the example of FIG. 1, each of the chips 103A-103D includes four transmit/receive optical ports. Therefore, the four chips 103A-103D collectively communicate with sixteen transmit/receive optical fiber connectors at the link-fiber interface.

Each transmit optical port on a given chip 103A-103D is associated with a separate laser input port on the given chip. Therefore, in the example of FIG. 1, because each chip 103A-103D has four transmit optical ports, and each chip 103A-103D has four laser input optical ports. Specifically, chip 103A has four laser input optical ports optically connected to four laser output ports of the laser light supply system 101 by optical fibers L1, L2, L3, L4, respectively. And, the chip 103A has four transmit optical ports optically connected to four transmit optical fiber connectors T at the link-fiber interface by optical fibers T1, T2, T3, T4, respectively. Also, chip 103B has four laser input optical ports optically connected to four laser output ports of the laser light supply system 101 by optical fibers L5, L6, L7, L8, respectively. And, the chip 103B has four transmit optical ports optically connected to four transmit optical fiber connectors T at the link-fiber interface by optical fibers T5, T6, T7, T8, respectively. Also, chip 103C has four laser input optical ports optically connected to four laser output ports of the laser light supply system 101 by optical fibers L9, L10, L11, L12, respectively. And, the chip 103C has four transmit optical ports optically connected to four transmit optical fiber connectors T at the link-fiber interface by optical fibers T9, T10, T11, T12, respectively. Also, chip 103D has four laser input optical ports optically connected to four laser output ports of the laser light supply system 101 by optical fibers L13, L14, L15, L16, respectively. And, the chip 103D has four transmit optical ports optically connected to four transmit optical fiber connectors T at the link-fiber interface by optical fibers T13, T14, T15, T16, respectively.

Additionally, in accordance with duplex configuration of the link-fiber interface in the example of FIG. 1, there is a separate receive optical fiber connector at the link-fiber interface for each transmit optical fiber connector at the link-fiber interface. Specifically, the chip 103A has four receive optical ports optically connected to four receive optical fiber connectors R at the link-fiber interface by optical fibers R1, R2, R3, R4, respectively. And, the chip 103B has four receive optical ports optically connected to four receive optical fiber connectors R at the link-fiber interface by optical fibers R5, R6, R7, R8, respectively. And, the chip 103C has four receive optical ports optically connected to four receive optical fiber connectors R at the link-fiber interface by optical fibers R9, R10, R11, R12, respectively. And, the chip 103D has four receive optical ports optically connected to four receive optical fiber connectors R at the link-fiber interface by optical fibers R13, R14, R15, R16, respectively. It should be understood, however, that in some embodiments the link-fiber interface of the optical module 100 may not have an equal number of transmit optical fiber connectors T and receive optical fiber connectors R.

The laser light supply system 101 is configured to output the N wavelengths of laser light at each laser output port with controlled polarization. It is of interest to maintain this controlled polarization of the laser light at the laser input optical ports of the chips 103A-103D. Therefore, the optical fibers L1-L16 that connect the laser input optical ports of the chips 103A-103D to the laser output ports of the laser light supply system 101 are polarization maintaining (PM) optical fibers (PMF's) that are configured to maintain a linear polarization of the laser light as the laser light travels through the PMF. Examples of PMF include PANDA PM Specialty Optical Fiber by Corning, Inc., and "bow-tie" style PMF-633-B1 by Coherent, Inc. It should be understood that that the optical fiber L1-L16 can be essentially any type of polarization maintaining fiber. However, as disclosed herein, a plurality of the optical fibers L1-L16 can be included within a PMF ribbon, where the mechanical structure of the PMF ribbon helps maintain a fixed orientation, i.e., polarization orientation, of each PMF along the length of the PMF ribbon. In this manner, the polarization orientation of each PMF within the PMF ribbon is fixed and known at each location along the length of the PMF ribbon.

The PMF's (L1-L16) include birefringence-inducing members that are configured to create a biaxial stress field in the core of the PMF. The biaxial stress field creates birefringence, such that at one orientation about the axis of the core there is one index of refraction, and at another orientation about the axis of the core there is another index of refraction. A feature of the birefringence is that when linear polarized light is transmitted into the core of the PMF in alignment to the birefringence field, the linear polarized light will remain linear polarized in alignment to the birefringence field as it travels through the PMF. In this manner, the PMF can be used to direct linear polarized light that is output by the laser light supply system 101 into the chip 103A-103D without changing the linear polarization of the light. And, the PMF is oriented at the chip 103A-103D so that the polarized light emitted from the PMF is properly aligned with the optical grating coupler on the chip 103A-103D so as to maintain linear polarization of the light as it enters the chip 103A-103D.

In contrast to the optical fibers L1-L16, the optical fibers T1-T16 that connect the transmit optical ports of the chips 103A-103D to the transmit optical fiber connectors T at the link-fiber interface are not polarization maintaining. In some embodiments, each of the optical fibers T1-T16 is a single mode fiber (SMF). Also, the optical fibers R1-R16 that connect the receive optical ports of the chips 103A-103D to the receive optical fiber connectors R at the link-fiber interface are not polarization maintaining. In some embodiments, each of the optical fibers R1-R16 is an SMF. The use of optical fibers T1-T16 and R1-R16 that are not polarization maintaining for the transmit and receive optical connections between the chips 103A-103D and the link-fiber interface avoid possible adverse polarization dispersion effects.

In some embodiments, the optical module 100 can be included as part of a system-on-chip (SOC) data communication system. In the SOC data communication system, or other system, the optical module 100 can be referred to as a "package." However, for description purposes, the term optical module 100 is used herein rather than "package." In some embodiments, the optical module 100 can be configured for use as an optical switch, with the chips 103A-103D connected by electrical links to an application-specific-integrated-circuit (ASIC). It should be understood, however, that the optical module 100 can be configured for many different uses in different applications.

During operation of the optical module 100, optical power, i.e., laser light, is generated by the laser light supply system 101 and is transmitted through the optical fibers L1-L16 to the chips 103A-103D. The laser light is modulated by the chips 103A-103D to encode digital data as modulated light. The modulated light is transmitted from the chips 103A-103D through the optical fibers T1-T16 to the link-fiber interface for transmission to an optical communication network. Also, modulated light that is received at the link-fiber interface from the optical communication network is transmitted through the optical fibers R1-R16 to the chips 103A-103D for demodulation to determine the digital data encoded within the received modulated light.

It should be understood that the laser light supply system 101 may encounter challenges with operation at high temperatures, such as reduced reliability and/or reduced efficiency. Therefore, in some embodiments, the laser light supply system 101 is sufficiently separated from the chips 103A-103D within the optical module 100 to allow adequate thermal management. In some embodiments, a gain medium of the laser light supply system 101 is not directly bonded to the chips 103A-103D and is not located within a minimum specified distance from the chips 103A-103A or from an ASIC to which the chips 103A-103D are connected. In some embodiments, the minimum specified distance is about 1 centimeter. However, it should be understood that in various embodiments, the minimum specified distance may be less than or greater than about 1 centimeter, depending on the thermal output of the chips 103A-103D and the thermal management capability of the laser light supply system 101 and the thermal management capability of the optical module 100. Also, while the example of FIG. 1 has the laser light supply system 101 installed within the optical module 100, it should be understood that in other embodiments, the laser light supply system 101 can be located outside of the optical module 100, with the optical fibers L1-L16 configured to carry the laser light from the laser light supply system 101 into the optical module 100 and to the chips 103A-103D.

Figure 2:
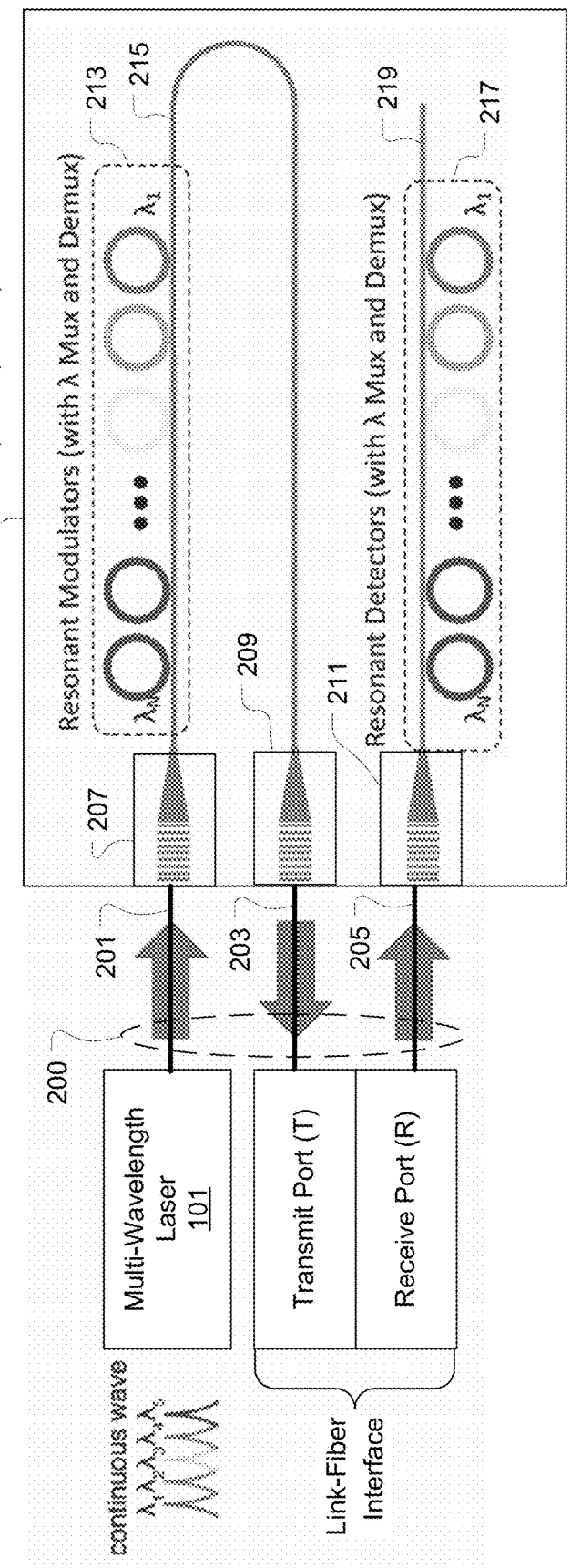
FIG. 2 shows a diagram of how a fiber set is used to connect the chip to the laser light supply system and the link-fiber interface, in accordance with some embodiments.

FIG. 2 shows a diagram of how a fiber set 200 is used to connect the chip 103A-103D to the laser light supply system 101 and the link-fiber interface, in accordance with some embodiments. Within the optical module 100, the fiber set 200 includes three optical fibers:

1) one PMF (one of L1-L16) connecting one laser output port of the laser light supply system 101 to one laser input optical port of the chips 103A-103D, 2) one SMF (one of T1-T16) connecting one transmit optical port of the chips 103A-103D to one transmit optical fiber connector T at the link-fiber interface, and 3) one SMF (one of R1-R16) connecting one receive optical fiber connector R at the link-fiber interface to one receive optical port of the chips 103A-103D.

The fiber set 200 includes an optical fiber 201 to connect one laser output port of the laser light supply system 101 to one laser input optical port of the chips 103A-103D. In the optical module 100 of FIG. 1, the optical fiber 201 is one of the optical fibers L1-L16. The optical fiber 201 is a PMF. The fiber set 200 also includes an optical fiber 203 to connect one transmit optical port of the chips 103A-103D to one transmit optical fiber connector T at the link-fiber interface. In the optical module 100 of FIG. 1, the optical fiber 203 is one of the optical fibers T1-T16. The optical fiber 203 is an SMF (not polarization maintaining). The fiber set 200 also includes an optical fiber 205 to connect one receive optical fiber connector R at the link-fiber interface to one receive optical port of the chips 103A-103D. In the optical module 100 of FIG. 1, the optical fiber 205 is one of the optical fibers R1-R16. The optical fiber 205 is an SMF (not polarization maintaining).

The laser input optical port of the chip 103A-103D includes an optical coupler 207 for receiving the laser light from the optical fiber 201. Because polarization of the light from the laser light supply system 101 to the chip 103A-103D is controlled by the optical fiber 201 being a PMF, the optical coupler 207 can be a single-polarization optical coupler. Also, the transmit optical port of the chip 103A-103D includes an optical coupler 209 for transmitting the modulated light (modulated to encode digital data) from the chip 103A-103D to the transmit optical fiber connector T at the link-fiber interface. Because the polarization of the modulated light transmitted from the chip 103A-103D to the transmit optical fiber connector T is controlled, the optical coupler 209 can be a single-polarization optical coupler. Also, the receive optical port of the chip 103A-103D includes an optical coupler 211 for receiving modulated light from the receive optical fiber connector R at the link-fiber interface. Because the modulated light received at the link-fiber interface is not polarization-controlled, the optical coupler 211 is a polarization-diverse optical coupler. It should be appreciated that the chips 103A-103D within the optical module 100 use both single-polarization optical couplers 207 and 209, and polarization-diverse optical couplers 211. In some embodiments, the optical couplers 207, 209, 211 are vertical couplers, which provide more flexibility in chip layout and more direct wafer-level testing. In some embodiments, the optical couplers 207, 209, 211 are vertical grating couplers compatible with high-volume manufacturing, e.g., zero-change CMOS.

Because the two optical couplers 207 and 209 for a given fiber set 200 can be single-polarization optical couplers, and just the one optical coupler 211 for the given fiber set 200 is a polarization-diverse optical coupler, cost is reduced and loss of light power within the optical module 100 is reduced. Loss of light power within the optical module 100 can require increased expense for optical amplifiers. Also, loss of light power within the optical module 100 can cause limitations on data capacity and bandwidth. There is a system tradeoff related to polarization-dependence of the optical couplers 207, 209, 211. More specifically, single-polarization optical couplers, such as 207 and 209, have lower loss of light power and lower chip footprint (which reduces cost). Therefore, it is beneficial to control polarization of light inputs to the chip 103A-103D at locations/interfaces external to the chip 103A-103D, with possible use of PMF to carry the polarization-controlled light to the chip 103A-103D. However, control of light polarization at too many locations/interfaces external to the chip 103A-103D can impose an unacceptable restriction on the larger system design. Therefore, it is useful to control light polarization through packaging at as many locations/interfaces external to the chip 103A-103D as possible, while providing polarization-diverse optical coupler capability at some limited number of chip interfaces.

In some embodiments, the chips 103A-103D are configured to include wavelength-division multiplexing (WDM) multiplexing and de-multiplexing functionality, resonant modulators, and resonant detectors. For example, FIG. 2 shows that the chip 103A-103D includes an optical waveguide 215 configured to carry incoming laser light from the optical coupler 207 through/near resonant modulators 213, which function to modulate the laser light to encode digital data. The modulated laser light is transmitted through the optical waveguide 215 to the optical coupler 209 for transmission through the optical fiber 203 to the transmit optical fiber connector T of the link-fiber interface. FIG. 2 also shows that the chip 103A-103D includes an optical waveguide 219 configured to carry incoming modulated laser light from the optical coupler 205 through/near resonant detectors 217, which function to detect and de-modulate the laser light to obtain digital data encoded within the incoming modulated laser light.

As light travels through a complete communications link, the light passes through the three optical couplers 207, 209, 211 on the chip 103A-103D. The light travels from the off-chip laser light supply system 101 through the optical coupler 207 to the on-chip resonant modulators 213. The light travels from the on-chip resonant modulators 213 through the optical coupler 209 to the link-fiber interface. The light travels from the link-fiber, i.e., network, through the link-fiber interface through the optical coupler 211 to the resonant detectors 217.

It is desired that all components within the optical link between the laser light supply system 101 and the chip 103A-103D (such as optical fiber, groove arrays, optical connectors, etc.) maintain polarization of the laser light as emitted from the laser light supply system 101. As mentioned above, it is useful to provide a polarization maintaining optical fiber between the laser light supply system 101 and the chip 103A-103D, since this optical fiber is short and the laser light already has a well-defined polarization. This allows the optical coupler 207 to be a single-polarization optical coupler.

It is desired that components within the optical links between the chip 103A-103D and the link-fiber interface (such as optical fibers, groove arrays, optical connectors, etc.) provide low PMD. The optical fibers used to connect the chip 103A-103D to the link-fiber interface (link fibers) are not polarization maintaining, because use of polarization maintaining optical fiber for the link fibers adds to total system cost, and may increase loss of light power, and may increase polarization mode dispersion (PMD), and may complicate standard fiber operations, such as splicing.

In optical connections that are intended to be polarization maintaining, such as between the laser light supply system 101 and the chip 103A-103D, polarization maintenance can be provided through use of PMF, and also by management of bend and twist induced perturbations, with particular attention to the symmetry of these perturbations with respect to the polarization axis. Generally, any portions of fiber longer than a few centimeters that cannot be carefully bend-managed should be PMF in order to achieve polarization control in the optical connection. However, a connection may include short sections of non-PMF, especially if these short sections of non-PMF are enclosed or otherwise protected from perturbations.

In optical connections that are not intended to be polarization maintaining and/or require low PMD, such as between the chip 103A-103D and the link-fiber interface, PMF should be avoided or segments of PMF should be kept short enough to contribute acceptable PMD. In some configurations, acceptable PMD implies that all of the WDM channels are at substantially the same polarization. If all WDM channels fall within frequency difference $\Delta f$ (e.g., about 1 TeraHertz (THz) of a nominal frequency, the total PMD (tPMD) satisfy the relationship: tPMD<<(1/$\Delta f$). For example, acceptable PMD should be much less than 1 picosecond, and so even moderate-lengths of PMF should be avoided. For example, the length of PMF used in an optical connection that is not intended to be polarization maintaining and/or requires low PMD should be less than or equal to about 10 centimeters.

Figure 3:
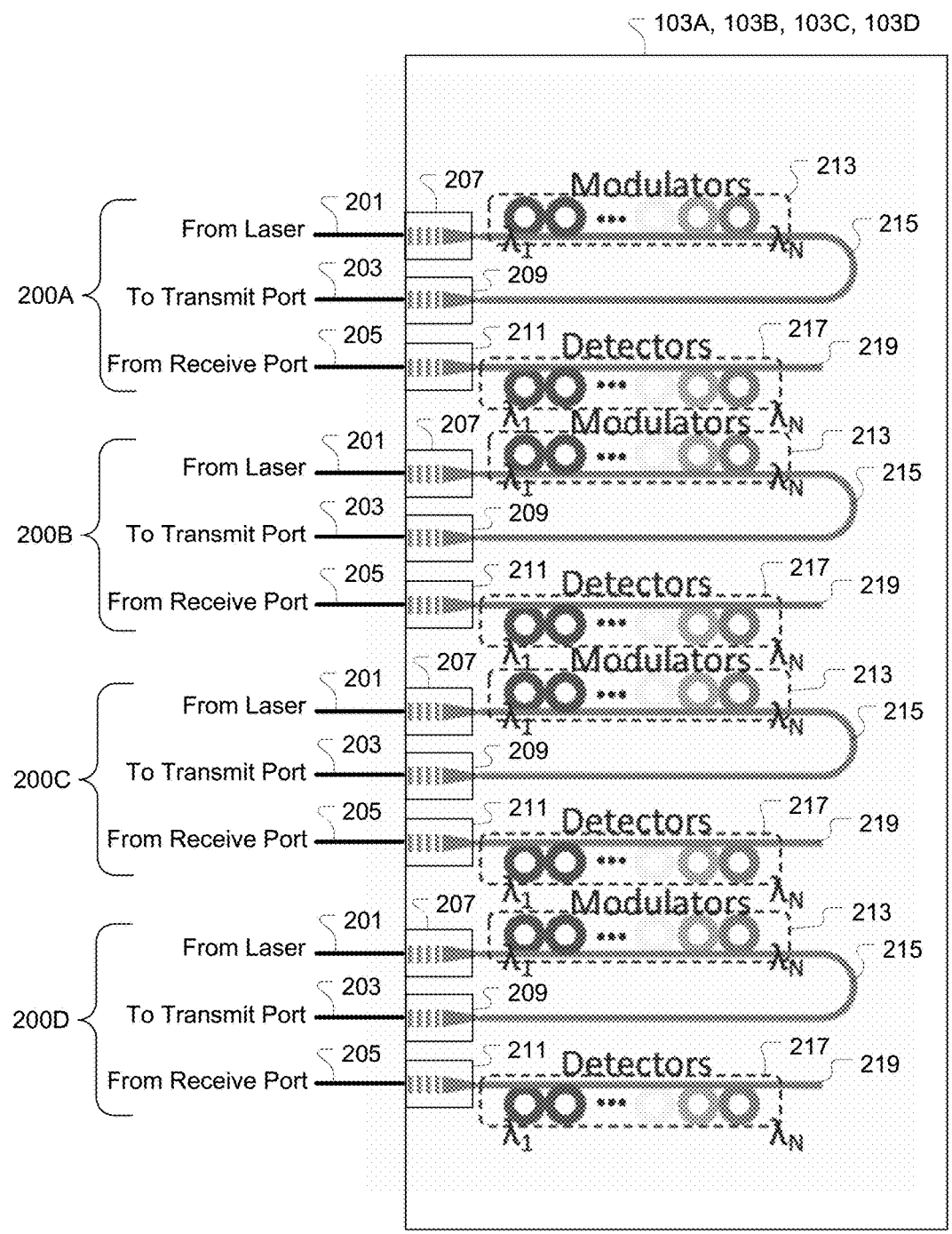
FIG. 3 shows a diagram of how four fiber sets are connected to a given one of the chips, in accordance with some embodiments.

FIG. 3 shows a diagram of how four fiber sets 200A, 200B, 200C, 200D are connected to a given one of the chips 103A-103D, in accordance with some embodiments. It should be understood that while the example embodiment of FIG. 1 shows four fiber sets 200A, 200B, 200C, 200D connected to each one of the chips 103A-103D, in various embodiments, any chip 103A-103D within the optical module 100 can be configured to connect with one or more fiber set(s) 200. And, it should be understood that connection of more fiber sets 200 to a given chip 103A-103D leverages the cost of the laser light supply system 101 over more data communication channels.

The optical module 100 is scalable to ultra-high capacity and is designed for low-cost manufacturing, where capacity can be represented by number of communication channels, i.e., number of transmit/receive ports in the link-fiber interface. Optical fibers within the optical module 100 may be vertically butt-coupled to the chip 103A-103D, but will preferably be packaged with optical fibers horizontal to the chip 103A-103D so that fiber-to-chip connection is more mechanically stable, resistant to external forces, vibrations, etc. Here horizontal is used to mean parallel to the plane of the fabrication layers of the chip 103A-103D. Also, an optical fiber may be considered vertical if the axis of the optical fiber is more than 45 degrees off of the plane of the chip 103A-103D. In some embodiments, the optical fibers are substantially horizontal, but light is redirected into a vertical beam aligned with vertical optical couplers on the chip 103A-103D, such as with optical couplers 207, 209, 211. Light may be redirected by a prism or angle-cleave, and the reflecting surface may further include coatings (e.g., dielectric or metallic) or a gap designed to improve optical coupling efficiency and manufacturability. Turning the optical beam allows a mechanically robust package (optical fibers are horizontal) while still providing the vertical beam needed for optical grating couplers on the chips 103A-103D.

Figure 4A:
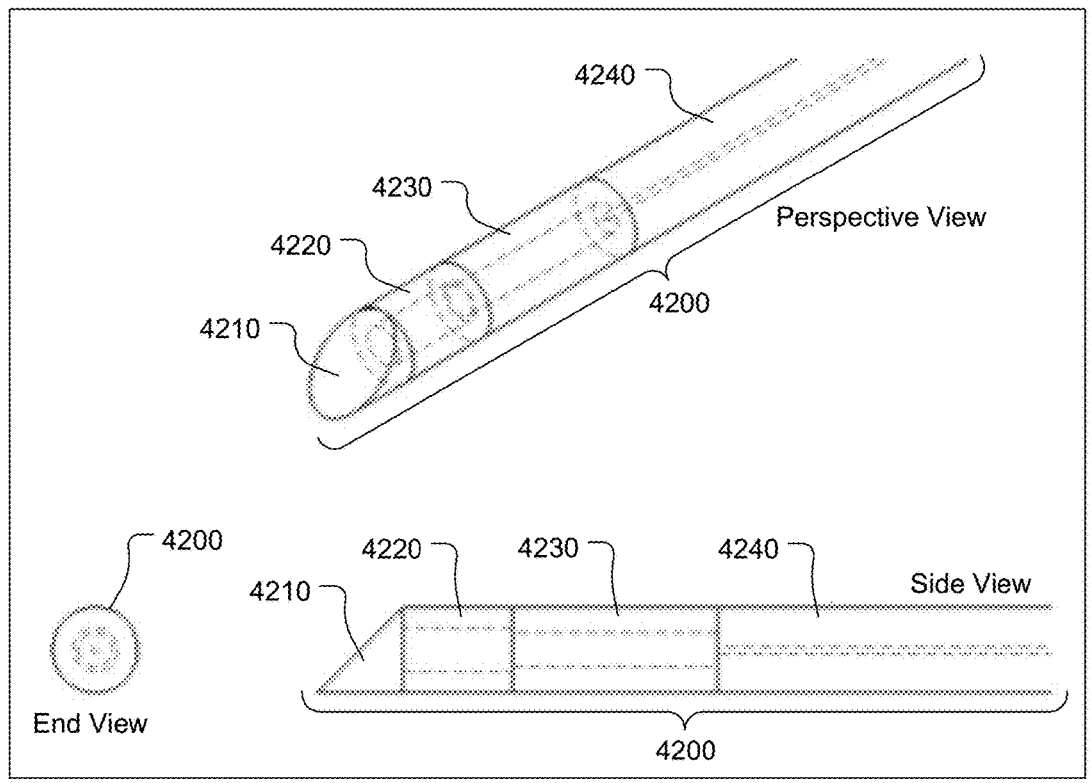
FIG. 4A shows a lens assembly for use in attaching an optical fiber to the chip in a parallel-coupled configuration, in accordance with some embodiments of the present invention.

FIG. 4A shows a lens assembly 4200 for use in attaching an optical fiber to the chip 103A-103D in a parallel-coupled configuration, in accordance with some embodiments of the present invention. In some embodiments, the lens assembly 4200 is a type of GRIN assembly that can be mated with a grating array that is physically addressed to the chip 103A-103D. In some embodiments, the lens assembly 4200 can be aligned with the grating array in a single alignment step to provide acceptable alignment of the light output from the lens assembly 4200 with the optical grating coupler on the chip 103A-103D. In various embodiments, use the lens assembly 4200 in combination with the grating array provides for passive/rough alignment of optical fibers with the optical couplers on the chip 103A-103D.

The lens assembly 4200 includes four regions: 1) a single mode fiber (SMF) 4240 region, 2) an optical gap structure 4230 region, 3) a multi-mode optical fiber (MMF) 4220 (graded index MMF) region, and 4) an optical end structure 4210 region. The optical end structure 4210 is optional. In some embodiments, the outer diameters of the optical end structure 4210, the MMF 4220, the optical gap structure 4230, and the SMF 4240 are similar. If the outer diameters of the optical end structure 4210, the MMF 4220, the optical gap structure 4230, and the SMF 4240 are similar, or approximately the same, it allows the optical end structure 4210, the MMF 4220, the optical gap structure 4230, and the SMF 4240 to be fusion spliced using commercially available equipment and leads to better alignment of the light beam with the center of the lens assembly 4200, including with the center of the SMF 4240. In an example embodiment, the outer diameter of each of the optical end structure 4210, the MMF 4220, the optical gap structure 4230, and the SMF 4240 is approximately 125 micrometers ($\mu$m). However, it should be understood that in other embodiments the outer diameter of each of the optical end structure 4210, the MMF 4220, the optical gap structure 4230, and the SMF 4240 can be either less than or greater than 125 $\mu$m.

In some embodiments, the optical gap structure 4230 is a coreless fiber. For example, in some embodiments, the optical gap structure 4230 is a 125 $\mu$m outer diameter coreless/acrylate termination optical fiber, such as that provided by the company OFS as their Item No. F15330, by way of example. It should be understood, however, that in other embodiments the optical gap structure 4230 can be another type of coreless fiber. Also, in some embodiments, the optical gap structure 4230 is a step-index MMF. For example, in some embodiments, the optical gap structure 4230 is a 50 $\mu$m core diameter/125 $\mu$m outer diameter step-index MMF, such as that provided by Prysmian Group as DrakaElite Specialty Fiber—RadHard 50 $\mu$m Step-Index Multimode Fibre, by way of example. It should be understood, however, that in other embodiments the optical gap structure 4230 can be another type of MMF.

Figure 4B:
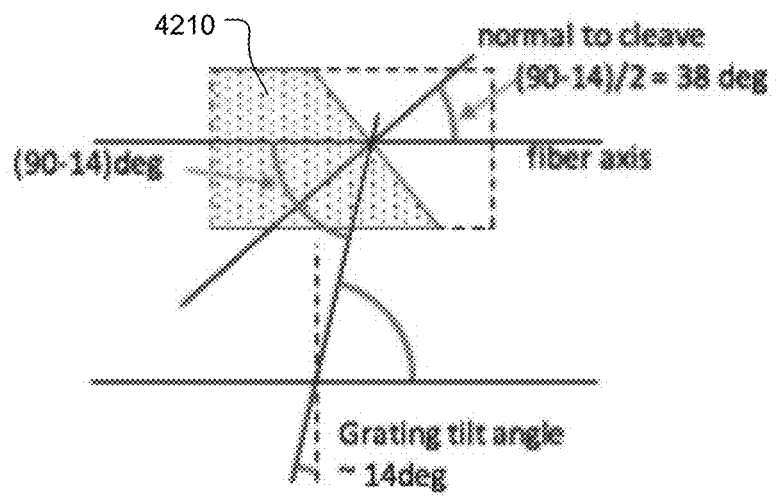
FIG. 4B shows an example cleaving of the optical end structure with example angles, in accordance with some embodiments of the present invention.

In some embodiments, the lens assembly 4200 does not include the optical end structure 4210. In some embodiments, the optical end structure 4210 can be a region filled with epoxy or other polymer approximately index-matched to the MMF 4220. In other embodiments, the MMF 4220 can be cleaved normal to the surface (i.e., substantially perpendicular to the axis of the lens assembly 4200) or at an angle (i.e., at an angle relative to the axis of the lens assembly 4200) if a lateral beam is desired. However, in some embodiments, the optical end structure 4210 is present and is cleaved normal to the axis of the lens assembly 4200. In some embodiments, the optical end structure 4210 is present and is cleaved at an angle relative to the axis of the graded index MMF 4220, or the optical gap structure 4230, or the SMF 4240. With an appropriate cleave, the optical end structure 4210 functions as a turning prism for the light that it receives from the graded index MMF 4220. FIG. 4B shows an example cleaving of the optical end structure 4210 with example angles, in accordance with some embodiments of the present invention.

In some embodiments, the end-face of the optical end structure 4210 (i.e., the face opposite of the graded index MMF 4220) is coated with a metallic mirror or a dielectric mirror. In some embodiments where the coating on the end-face of the optical end structure 4210 is a dielectric mirror, the coating can include a layered stack, enabling broadband reflection. Also, in the embodiments where the end-face of the optical end structure 4210 is coated with the mirror, the end-face will continue to function as the mirror when it is coated with an optical index matching epoxy.

In some embodiments of the lens assembly 4200, the MMF 4220 is a graded index MMF. For example, in some embodiments, the MMF 4220 is a 62.5 μm core diameter/125 μm outer diameter acrylate silica fiber, such as that provided by the company OFS as their Item No. BF04431-01, by way of example. It should be understood, however, that in other embodiments the MMF 4220 can be another type of graded index MMF.

In some example embodiments, the SMF 4240 is an optical fiber such as SMF-28 Ultra Optical Fiber provided by the company Corning, by way of example. In some example embodiments, the SMF 4240 is compliant with the ITU-T G.652 standard. In some example embodiments, the SMF 4240 is a Polarization Maintaining Fiber (PMF). For example, in some embodiments where the SMF 4240 is a PMF, the birefringent axes can be aligned relative to the cleaved angle of the optical end structure 4210, if present. For example, the slow axis of the PMF can be aligned at 0°, 90°, or at any arbitrary angle relative to the major axis of the cleave of the optical end structure 4210, if present. In some example embodiments, the SMF 4240 is a PANDA optical fiber provided by the company Corning, by way of example. Additionally, in some embodiments, multiple SMF's 4240 and corresponding lens assemblies 4200 are attached to the chip 103A-103D in the parallel-coupled configuration with the multiple SMF's 4240 configured as an optical fiber array/ribbon. In these optical fiber array/ribbon embodiments, the multiple SMF's 4240 can be any combination of optical fibers, such as SMF-28 Ultra Optical Fiber and PANDA optical fiber, by way of example, as well as any other type of SMF 4240.

FIG. 4C shows an interface of eight instances of the lens assembly 4200 (e.g., 4200-1 through 4200-8) with the chip 103A-103D, in accordance with an example embodiment of the present invention. In some embodiments, the chip 103A-103D can include one or more vertical grating couplers, such as optical couplers 207, 209, 211 to enable optical connection with one or more optical fibers. In some embodiments, individual lens assemblies 4200 can be connected to the chip 103A-103D. However, in some embodiments, multiple instances of the lens assembly 4200 (e.g., 4200-1 through 4200-8) can be connected to the chip 103A-103D. In these embodiments, multiple SMF's 4240 can be configured as an optical fiber ribbon assembly. For example, FIG. 4C shows an array of eight optical fibers 4610-1 through 4610-8 connected to the chip 103A-103D, where the optical fibers 4610-1 through 4610-8 correspond to the SMF's 4240. Each optical fiber 4610-1 through 4610-8 has a corresponding one of the eight lens assemblies 4200-1 through 4200-8. In these embodiments, after the polymer jacket (coating over the cladding of the SMF's) is removed (as part of the cleaving operation), the cleave and splice operation can continue in parallel (i.e., as ribbon assemblies). Therefore, it should be understood that multiple instances of the lens assembly 4200 as described above can be simultaneously formed in a ribbon-like manner to accommodate multiple SMF 4240 fibers. In some example embodiments, a number of the multiple SMF 4240 fibers accommodated by multiple instances of the lens assembly 4200 formed in the ribbon-like manner is 2, 4, 8, 12, 16, or 24. However, in other embodiments, any number of the multiple SMF 4240 fibers can be accommodated by a corresponding number of multiple instances of the lens assembly 4200 formed in the ribbon-like manner. Also, as additional optical fiber ribbons become commercially available, the number of the multiple SMF 4240 fibers accommodated by the corresponding number of multiple instances of the lens assembly 4200 formed in the ribbon-like manner will increase.

FIG. 4C shows a region 4620 where the silicon has been thinned. For SOI (silicon-on-insulator) wafers, the handle silicon can be etched down to the buried oxide (BOX). For bulk CMOS wafers, the backside silicon can be etched down to the shallow trench isolation. The specific pattern of the region 4620 can be adjusted lithographically. In FIG. 4C, the region 4260 includes a number of ridges 4630. These ridges 4630 help to align the optical fibers 4610-1 through 4610-8 to the vertical coupler on the chip 103A-103D. The ridges 4630 can have any shape, so long as they do not interfere with the placement of the optical fibers 4610-1 through 4610-8. For example, in various embodiments, the ridges 4630 can be V-shaped (to form V-grooves), posts, or completely absent. In some embodiments, the optical fibers 4610-1 through 4610-8 are epoxied to the chip 103A-103D within the region 4620. If the end face of the optical end structure 4210 is not coated, then it is necessary for the end face to remain free of index matched epoxy. However, if the end face of the optical end structure 4210 is coated with a reflective material, then the optical end structure 4210 can be submerged in epoxy.

Figure 4E:
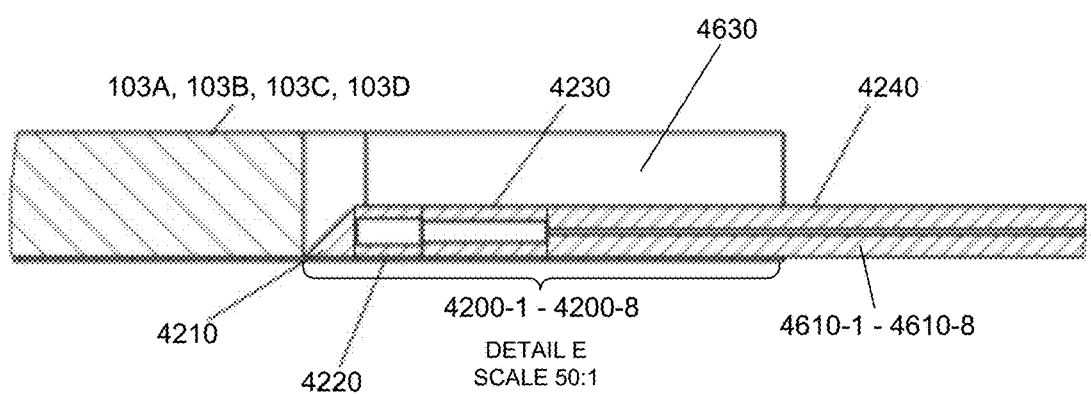
FIG. 4E shows Detail E of FIG. 4D, in accordance with some embodiments of the present invention.

FIG. 4D shows a top-down view of the chip 103A-103D of FIG. 4C, in accordance with some embodiments of the present invention. FIG. 4E shows Detail E of FIG. 4D, in accordance with some embodiments of the present invention. In some embodiments, the angle of the optical end structure 4210 is cleaved so that the light propagation turns towards the chip 103A-103D. For example, if the chip 103A-103D has a vertical coupler with an angle of acceptance of 14° from normal, then the end region 4210 should be cleaved such that the light propagates at an angle of 14° from a reference direction perpendicular to the plane of the chip 103A-103D.

With reference back to FIG. 4B, the relationship between the tilt angle of the grating and the angle of the cleave is shown. For a grating tilt angle, the angle between the optical fiber axis and the cleave normal should be (90°—tilt angle)/2. For example, for the counter-propagating configuration shown in FIG. 4B, a cleave angle of about 38° is suitable for a grating tilt angle of about 14°. For a co-propagating configuration, the same formula applies, for example a cleave angle of about 52° would be suitable for a grating tilt angle of about −14°. In various embodiments, the grating tilt angle can be either positive or negative. In some example embodiments, the absolute value of the grating tilt angle is within the range extending from about 10° to about 25°. However, in other embodiments, the grating tilt angle can be less than about 10°, or greater than about 25°.

Figure 5A:
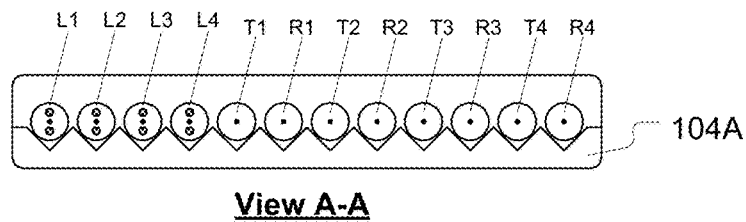
FIG. 5A shows a vertical cross-section through a connector of the chip, corresponding to View A-A as shown in FIG. 1, in accordance with some embodiments.

FIG. 5A shows a vertical cross-section through a connector 104A of the chip 103A, corresponding to View A-A as shown in FIG. 1, in accordance with some embodiments. The connector 104A is formed to have grooves for assisting with and passively controlling alignment of the optical fibers L1-L4, T1-T4, and R1-R4 to corresponding optical ports on the chip 103A. The example connector 104A in FIG. 5A shows use of "V" grooves, which can be produced through anisotropic etching of crystalline materials in some example embodiments. Groove arrays, such as shown in FIG. 5A, may be directly etched into the chip 103A or into an additional substrate block that is addressed, i.e., spatially aligned, to the chip 103A. FIG. 5A shows that the four optical fibers L1-L4 (PMF) are positioned next to each other, and the optical fibers T1-T4 (SMF) and R1-R4 (SMF) are positioned next to each other. The positions of the various optical fibers within the connector 104A is determined in part by the configuration of the chip 103A. Also, a particular arrangement of the optical fibers (PMF vs. SMF and/or laser vs. transmit vs. receive) across the connector 104A is driven primarily by chip 103A design considerations.

Figure 5B:
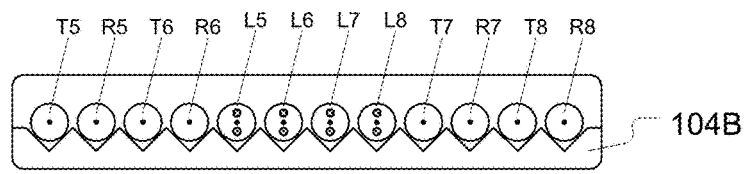
FIG. 5B shows a vertical cross-section through a connector of the chip, corresponding to View B-B as shown in FIG. 1, in accordance with some embodiments.

FIG. 5B shows a vertical cross-section through a connector 104B of the chip 103B, corresponding to View B-B as shown in FIG. 1, in accordance with some embodiments. As with the connector 104A, the connector 104B also has a "V" grooves for assisting with and passively controlling alignment of the optical fibers L5-L8, T5-T8, and R5-R8 to corresponding optical ports on the chip 103B. FIG. 5B shows that the four optical fibers L5-L8 (PMF) are positioned next to each other, and the optical fibers T5-T8 (SMF) and R5-R8 (SMF) are positioned next to each other. The positions of the various optical fibers within the connector 104B is determined by the configuration of the chip 103B. Also, a particular arrangement of the optical fibers (PMF vs. SMF and/or laser vs. transmit vs. receive) across the connector 104B is driven primarily by chip 103B design considerations.

Figure 5C:
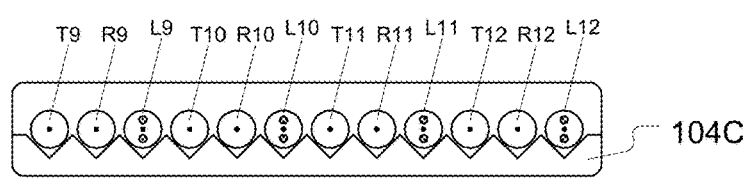
FIG. 5C shows a vertical cross-section through a connector of the chip, corresponding to View C-C as shown in FIG. 1, in accordance with some embodiments.

FIG. 5C shows a vertical cross-section through a connector 104C of the chip 103C, corresponding to View C-C as shown in FIG. 1, in accordance with some embodiments. As with the connector 104A, the connector 104C also has a "V" grooves for assisting with and passively controlling alignment of the optical fibers L9-L12, T9-T12, and R9-R12 to corresponding optical ports on the chip 103C. FIG. 5C shows that the four optical fibers L9-L12 (PMF) are separated from each other by two of the optical fibers T9-T12 (SMF) and R9-R12 (SMF). The positions of the various optical fibers within the connector 104C is determined by the configuration of the chip 103C. Also, a particular arrangement of the optical fibers (PMF vs. SMF and/or laser vs. transmit vs. receive) across the connector 104C is driven primarily by chip 103C design considerations. Having an interleaved arrangement of polarization-maintaining optical fibers (e.g., L9-L12) and non-polarization-maintaining optical fibers (e.g., T9-T12 and R9-R12) can have advantages for chip (e.g., 103C) layout in that each laser input optical coupler 207 on the chip can be in close proximity to the corresponding transmit optical coupler 209 and the corresponding receive optical couplers 211 on the chip.

Figure 5D:
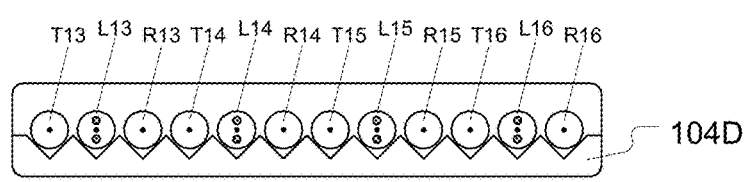
FIG. 5D shows a vertical cross-section through a connector of the chip, corresponding to View D-D as shown in FIG. 1, in accordance with some embodiments.

FIG. 5D shows a vertical cross-section through a connector 104D of the chip 103D, corresponding to View D-D as shown in FIG. 1, in accordance with some embodiments. As with the connector 104A, the connector 104D also has a "V" grooves for assisting with and passively controlling alignment of the optical fibers L13-L16, T13-T16, and R13-R16 to corresponding optical ports on the chip 103D. FIG. 5D shows that the four optical fibers L13-L16 (PMF) are separated from each other by two of the optical fibers T13-T16 (SMF) and R13-R16 (SMF). The positions of the various optical fibers within the connector 104D is determined by the configuration of the chip 103D. Also, a particular arrangement of the optical fibers (PMF vs. SMF and/or laser vs. transmit vs. receive) across the connector 104D is driven primarily by chip 103D design considerations.

In FIGS. 5A-5D, polarization-maintaining connections are depicted schematically as PANDA-type PMF (with stress rods aligned along the short dimension of the ribbon, i.e., vertically in the figures). But, in general, the polarization-maintaining connections within the connectors 104A-104D may include other types of fiber including short or bend-managed sections of non-polarization-maintaining fiber. As depicted in the connectors 104A and 104B, the polarization-maintaining connections may be grouped together (separated from the data channels). In some embodiments, laser and data link connections may be grouped by which chip 103A-103D they connect to (with any permutation that may be suitable for connecting to the chip 103A-103D).

If a polarization-maintaining optical connection is formed using PMF, it is required that the PMF be orientation-aligned at the polarization-maintaining optical connection, so that the polarization axis of the light remains well-aligned with the axis of PMF throughout the system to avoiding polarization crosstalk. Orientation alignment of the PMF can be achieved in several ways. In some embodiments, each PMF can be rotated while monitoring an orientation-dependent feedback signal (visual, optical transmission, etc.). When the orientation-dependent feedback signal indicates proper orientation alignment of the PMF, the orientation of the PMF can be fixed, such as by tacking the fiber to a substrate. This approach introduces a manufacturing cost proportional to the number of PMF's that must be orientation-aligned.

In some embodiments, multiple PMF can be put together in a ribbon structure, i.e., as a PMF ribbon, such that a birefringent axis of each individual PMF is substantially aligned along a long dimension of the ribbon structure. Such a PMF ribbon could be produced through feedback control of the orientation of each PMF during production of the PMF ribbon. Also, in some embodiments, each PMF can be produced with a mechanical feature, e.g., flat surface, that assists with orientation control of the PMF during spooling of the PMF, e.g., during fiber draw, or during PMF ribbon production. PMF with such mechanical features can be mass-produced, e.g., by grinding a flat in the preform from which the PMF is drawn. In this case feedback control of the orientation of each PMF may not be needed to produce an oriented PMF ribbon. Chip and connector arrangements where multiple PMF's are adjacently positioned, such as in connectors 104A and 104B for chips 103A and 103B, respectively, have an advantage in that the multiple PMF's can be formed integrally within the PMF ribbon and maintain the structural configuration of the PMF ribbon to the connector 104A/104B at the chip 103A/103B, which helps with alignment of the multiple PMF's at the chip 103A/103B. Also, in some embodiments, a quasi-PM fiber ribbon can be produced by arranging a ribbon of non-polarization-maintaining fibers so as to induce birefringence. The birefringence in the quasi-PM fiber ribbon may be substantially smaller than that of typical commercial PMF, particularly when the length and perturbations of the quasi-PM fiber ribbon can be managed.

Figure 5E:
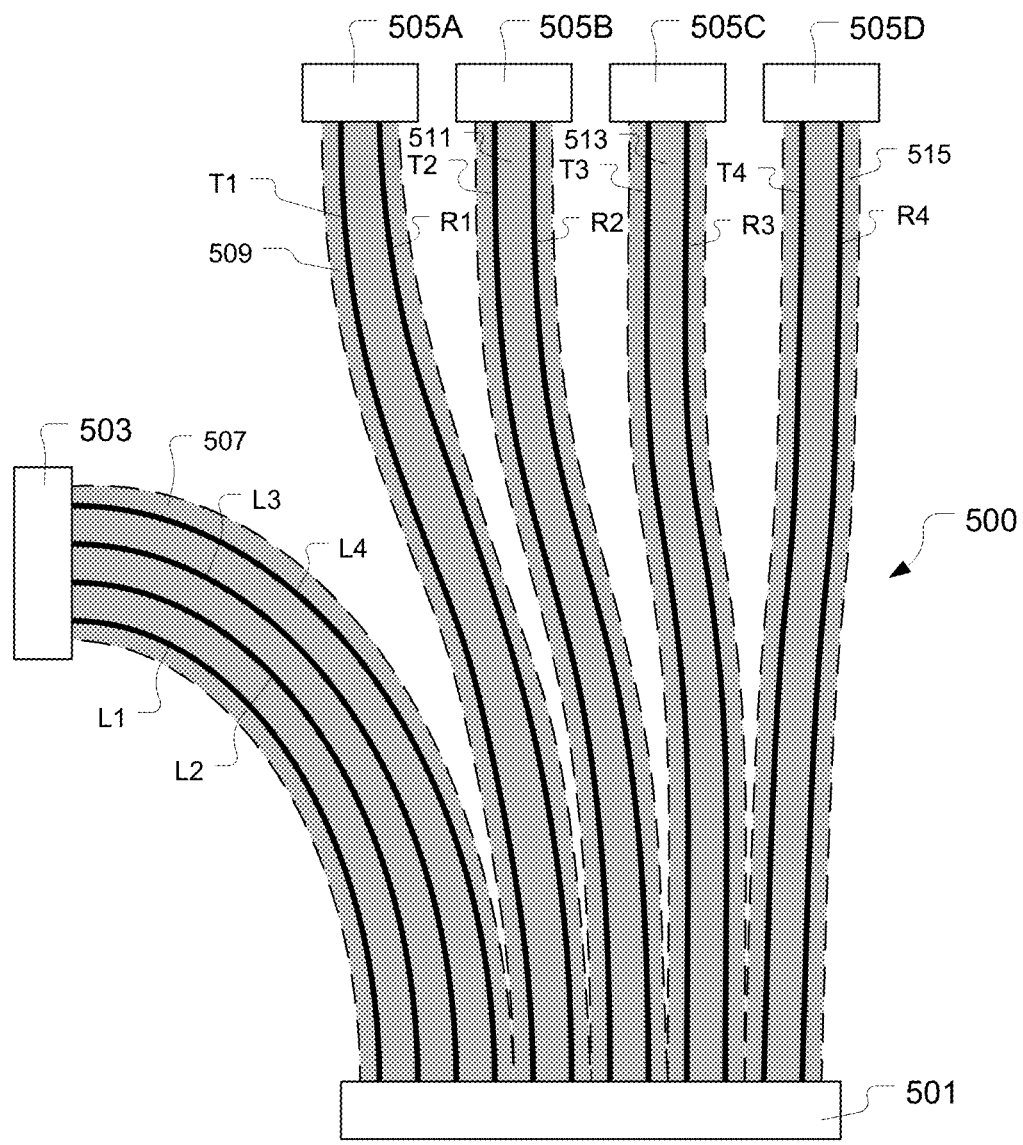
FIG. 5E shows a SQUID assembly, in accordance with some embodiments.

FIG. 5E shows a SQUID assembly 500, in accordance with some embodiments. The SQUID assembly 500 is a connectorized sub-assembly that enables alignment of optical fiber connections, such as within the optical module 100, and facilitates testing and manufacturing of optical fiber connections and associated optical systems. In the example SQUID assembly 500, a connector 501 is configured to align, interface, and connect/attach with the connector 104A of the chip 103A. It should be understood, however, that in various embodiments, the connector 501 of the SQUID assembly 500 can be configured to align, interface, and connect/attach with either of the connectors 104B, 104C, 104C, or any other type of chip connector. It should be understood that the connector 501 maintains a fixed physical position and fixed orientation of each of the four PMF's L1-L4. In this manner, the connector 501 maintains a polarization alignment of each of the four PMF's L1-L4 in a known orientation that matches a polarization alignment of corresponding optical fibers and/or optical waveguides within the connector 104A to which the connector 501 is intended to connect. Also, the connector 501 in the example of FIG. 5E has the four PMF's L1-L4 positioned side-by-side within the connector 501. This allows the four PMF's L1-L4 to be formed within a PMF ribbon in some embodiments. Therefore, in some embodiments, a PMF ribbon 507 can be attached to the connector 501 of the SQUID assembly 500. However, it should be understood that in some embodiments the four PMF's L1-L4 can be individually articulatable PMF's, i.e., not part of a common multi-PMF structure, such as a PMF ribbon or the like, at respective insertion locations on the connector 501.

The SQUID assembly 500 also includes a connector 503 configured to connect to a connector 102 of the laser light supply system 101. The connector 503 in the example of FIG. 5E has the four PMF's L1-L4 positioned side-by-side within the connector 503. It should be understood that the connector 503 maintains a fixed physical position and fixed orientation of each of the four PMF's L1-L4. In this manner, the connector 503 maintains a polarization alignment of each of the four PMF's L1-L4 in a known orientation that matches a polarization alignment of corresponding optical fibers and/or optical waveguides within the connector 102 of the laser light supply system 101 to which the connector 503 is intended to connect. Also, the connector 503 in the example of FIG. 5E has the four PMF's L1-L4 positioned side-by-side within the connector 503. This allows the four PMF's L1-L4 to be formed within a PMF ribbon in some embodiments. Therefore, in some embodiments, the PMF ribbon 507 can be attached to the connector 503 of the SQUID assembly 500. In some embodiments, a multicore optical fiber can be made so that the birefringent axis of the polarization-maintaining connections has a predictable orientation. For example, a multicore optical fiber can be made to have an outer flat or as a ribbon-like optical fiber with multiple cores in a line, with stress elements inducing a birefringent axis along the flat or ribbon's long axis. Also, in some embodiments, a birefringent axis can be induced radially. However, it should be understood that in some embodiments the four PMF's L1-L4 can be individually articulatable PMF's, i.e., not part of a common multi-PMF structure, such as a PMF ribbon or the like, at respective insertion locations on the connector 503.

The SQUID assembly 500 also includes connectors 505A, 505B, 505C, 505D that are each configured to connect to the link-fiber interface of the optical module 100. In some embodiments, the connectors 505A, 505B, 505C, 505D actually function as the transmit/receive optical fiber connectors (T/R) of the link-fiber interface. In some embodiments, the connectors 505A, 505B, 505C, 505D are duplex-type optical connectors, such as LC, FC, SC, or essentially any other type of optical connector. The non-polarization-maintaining optical fibers in the SQUID assembly 500, e.g., T1-T4 and R1-R4, can be terminated at the connectors 505A, 505B, 505C, 505D to form the link-fiber interface that is exposed on the exterior surface of the optical module 100. In the example SQUID assembly 500 of FIG. 5E an SMF extends between the connector 501 and the connectors 505A-505D for each transmit and receive optical data connection. Specifically, separate SMF's T1-T4 and R1-R4 are provided for the respective optical data connections.

Deployment of the optical module 100 can include plugging link-fiber cables with compatible duplex connectors into the connectors 505A-505D at the exterior surface of the optical module 100. In this manner, the transmit fiber of one optical module 100 can be connected through the link fiber to the receive fiber of another optical module 100, and vice-versa. For higher-bandwidth connections, the connectors 505A-505D may include more than two optical fibers, fiber ribbons, a multicore fiber, and/or a tapered fiber bundle.

In some embodiments the SMF's T1-T4 and R1-R4 can be individually articulatable SMF's, i.e., not part of a common multi-PMF structure, such as a PMF ribbon or the like. However, in some embodiments, multiple ones of the SMF's T1-T4 and R1-R4 can be included together within a common multi-SMF structure, such as an SMF ribbon or the like. For example, the example SQUID assembly 500 of FIG. 5E shows the SMF's T1 and R1 formed together within an SMF ribbon 509. Also, the SMF's T2 and R2 are formed together within an SMF ribbon 511. And, the SMF's T3 and R3 are formed together within an SMF ribbon 513. And, the SMF's T4 and R4 are formed together within an SMF ribbon 515. While the example SQUID assembly 500 of FIG. 5E includes four SMF ribbons 509, 511, 513, 515, it should be understood that in various embodiments the SQUID assembly 500 can include any number of SMF ribbons, microcables, and/or multi-core optical fibers as needed to make the optical data connections between the connector 501 and the connectors of the link-fiber interface, e.g., connectors 505A-505D. Also, in various embodiments, the SMF ribbons having more than two cores can be used in the SQUID assembly 500 to make the optical data connections between the connector 501 and the connectors (T, R) of the link-fiber interface. It should be understood that microcables and/or optical fiber ribbons in the SQUID assembly 500 can be configured to provide a fiber-management solution and may provide some protection and control of bend and twist seen by the optical fibers.

The connector 501 of the SQUID assembly 500 can have different arrangements of positions of laser-connections (e.g., L1-L4) and data link connection channels (e.g., T1-T4 and R1-R4) to accommodate different corresponding arrangements in the connectors 104A-104D of the chips 103A-103D, such as shown in FIGS. 5A-5D, in order to balance the needs of chip 103A-103D layout and facilitate manufacturing of the SQUID assembly 500, and/or satisfy other layout and fabrication requirements.

In some embodiments, positioning of the laser connection optical fibers (e.g., L1-L4) adjacent to each other in the connector 501 can facilitate manufacturing of the SQUID assembly 500 and may provide improved polarization extinction ratio (PER) of the polarization maintaining connections. With the laser connection optical fibers (e.g., L1-L4) positioned adjacent to each other in the connector 501, the physical orientation of the polarization axis of the laser connection optical fibers (e.g., L1-L4) can be more easily controlled.

Figure 6:
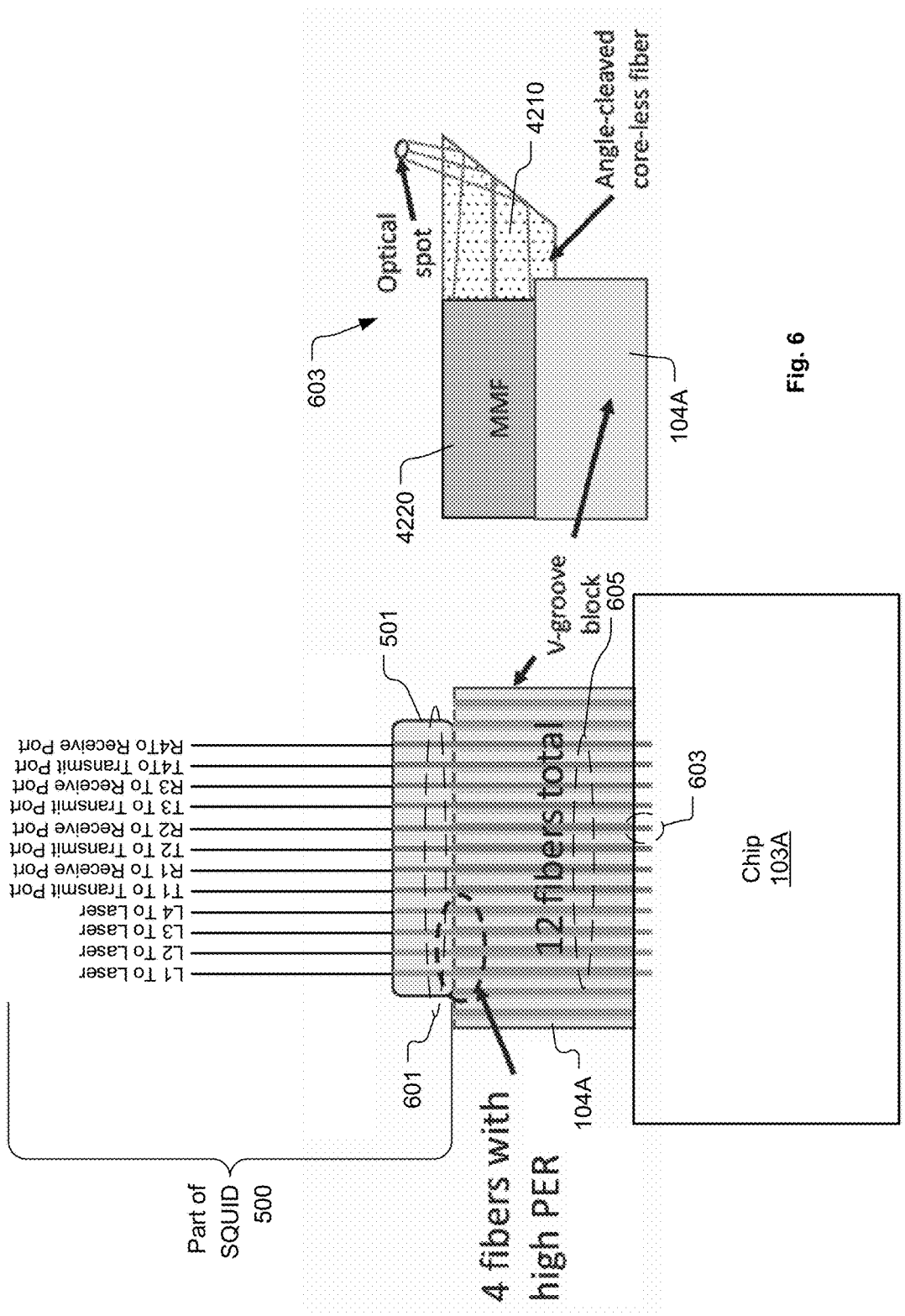
FIG. 6 shows a diagram of how the SQUID assembly can be connected to a chip, in accordance with some embodiments.

FIG. 6 shows a diagram of how the SQUID assembly 500 can be connected to a chip, in accordance with some embodiments. The example of FIG. 6 shows the connector 501 of the SQUID assembly 500 connected to the connector 104A of the chip 103A. In some embodiments, SMF can be used inside the connector 104A of the chip 103A, even for connections where polarization is to be maintained, because the orientation of the SMF can be tightly controlled within the connector 104A over the short length of the SMF that is present inside the connector 104A. For example, FIG. 6 shows a region 601 where SMF is used for the polarization-maintaining connections associated with optical connection of the chip 103A to the laser light supply system 101, i.e., associated with PMF's L1-L4. And, FIG. 6 shows a region 605 indicating that all 12 optical fibers within the connector 104A can be SMF. Use of SMF inside the connector 104A of the chip 103A can make manufacturing easier because alignment of the SMF is not required inside the connector 104A, whereas controlled alignment of PMF would be required if PMF were used inside the connector 104A. Also, SMF is less expensive than PMF. So, overall cost and manufacturing time can be reduced by using SMF inside the connector 104A of the chip 103A, as opposed to using PMF, so long as the polarization orientation of the SMF is carefully controlled within the connector 104A for the polarization-maintaining connections. It should be understood that the SMF used in the connector 104A of the chip 103A can be essentially any type optical fiber that is not PMF and that has a high polarization extinction ratio (PER), such that the polarization does not wander in the SMF within the connector 104A.

In some embodiments, the connector 104A is a connectorized beam-turning assembly, such as depicted by a region 603. In some embodiments, the connector 104A can include a graded-index (GRIN) region to provide optical lensing, such as the MMF 4220, in which case the connector 104A can be considered a type of GRIN array assembly. The connector 104A is a 3×N connector, in that the connector 104A provides for connection of N fiber sets 200, and therefore includes 3×N optical fiber connections. In the example of FIG. 6, the connector 104A accommodates N=4 fiber sets, and therefore includes 12 optical fiber connections. In some embodiments, the connector 104A can include additional optical fiber connections beyond the 3×N optical fiber connections to accommodate connection of spare optical fibers, and/or optical fibers carrying auxiliary signals, and/or optical fibers for other purposes. For example, a connector 104A designated as 3×N+1 is configured to provide for connection of N fiber sets 200 and 1 additional optical fiber. In some embodiments, the connector 104A can be keyed to so to ensure that the optical fibers in the connector 501 have the proper orientation. The connector 104A is configured to ensure that single-polarization optical couplers 207 on the chip 103A are matched to polarization-controlled connections, such as L1-L4, and to ensure that polarization-diverse optical couplers 211 on the chip 103A are matched to low-PWD connections, such as the receive optical data connections R1-R4. In the example connector 104A, the optical fiber cores are arranged in a single line. However, in various embodiments, the optical fiber cores can be arranged in other ways, such as in a multiple line arrangement or in a triangular lattice arrangement, among other arrangements. In some embodiments, a spacing between adjacent optical fiber cores within the connector 104A is either about 250 micrometers or about 125 micrometers to correspond with standard non-PMF optical fiber ribbon configurations and connectors. However, it should be understood that in various embodiments the spacing between adjacent optical fiber cores within the connector 104A can be set at essentially any size that provides for connection with the connector 501 or with other fiber ribbon configurations and connectors. In some embodiments, spacing between adjacent optical fiber cores within the connector 104A is reduced to correspond with a reduced spacing of the on-chip optical coupling elements, which corresponds to a reduced chip footprint of the optical coupling array, which may have benefits in cost and thermal management of the chip. Reduction in the spacing between adjacent optical fiber cores within the connector 104A can include use of a tapered fiber bundle and/or a multicore fiber.

In some embodiments, the connector 104A can be configured as a connectorized optical focusing assembly that forms part of the optical connection between the chip 103A and the laser light supply system 101, and/or between the chip 103A and the link-fiber interface. For example, the GRIN focusing elements within the connector 104A can be configured to direct light propagating in each optical fiber mode into a focused spot. The array of GRIN focusing elements within the connector 104A can generate an arrangement of such focused spots to match with an array of optical coupling elements on the chip 103A. It should be appreciated that connector 104A provides for easy connection, disconnection, and re-connection for testing, building, etc., and may include a standard ribbon connector. The connector 104A configured as a connectorized optical focusing assembly can be fabricated by splicing SMF, graded-index optical fiber, and possibly coreless optical fiber, along with an angled cleave or prism that re-directs light towards the chip 103A, such as discussed with regard to FIGS. 4A through 4E.

In some embodiments, optical fibers within the connector 104A may be positioned in an array of grooves or channels, such as the "V" grooves discussed with regard to FIG. 5A. The grooves or channels enable partial or complete alignment of the optical fibers in a passive manner. For example, optical fibers can be placed in the array of grooves or channels passively (i.e., without actively monitoring light signals through the optical fibers as they are placed in the array of grooves or channels) so that the position of the optical fibers transverse to the grooves/channels and the length direction of the optical fibers is fixed, with a final active alignment step used to adjust a single axial alignment of the optical fibers, i.e., to adjust the polarization orientation of the optical fibers. And, in some embodiments, an additional mechanical feature may be provided on the optical fibers and/or the connector 104A to properly orient the optical fibers at the correct axial alignment, thereby allowing passive axial alignment of the optical fibers within the connector 104A. In various embodiments, the array of grooves or channels can be formed in a substrate of the connector 104A and/or in the chip 103A-103B.

In some embodiments, the connector 104A can be configured to interface with optical fiber ribbon or optical fiber arrays. In some embodiments, such interfacing optical fiber ribbons or arrays can be produced using small-glass-outer-diameter optical fiber (e.g., optical fiber with 80-micrometers or less glass-outer-diameter can be produced) with fiber coatings thinner than standard coatings. In some embodiments, the connector 104A can be configured to interface with optical fiber ribbon or optical fiber arrays that have a core spacing of about 140 micrometers or less. To achieve even smaller core spacing, one or more multicore optical fibers can be used and the connector 104 can be correspondingly configured to match the multicore arrangement. For example, a polarization-maintaining multicore fiber may be used to connect the laser light supply system 101 to any of the chips 103A-103D. In some embodiments, a tapered multicore connector or tapered fiber bundle may be used as a fan-out from a dense arrangement of cores within the connector 104A to a more standard arrangement of cores within optical fibers, ribbons, and/or connectors that need to interface with the connector 104A.

Figure 7:
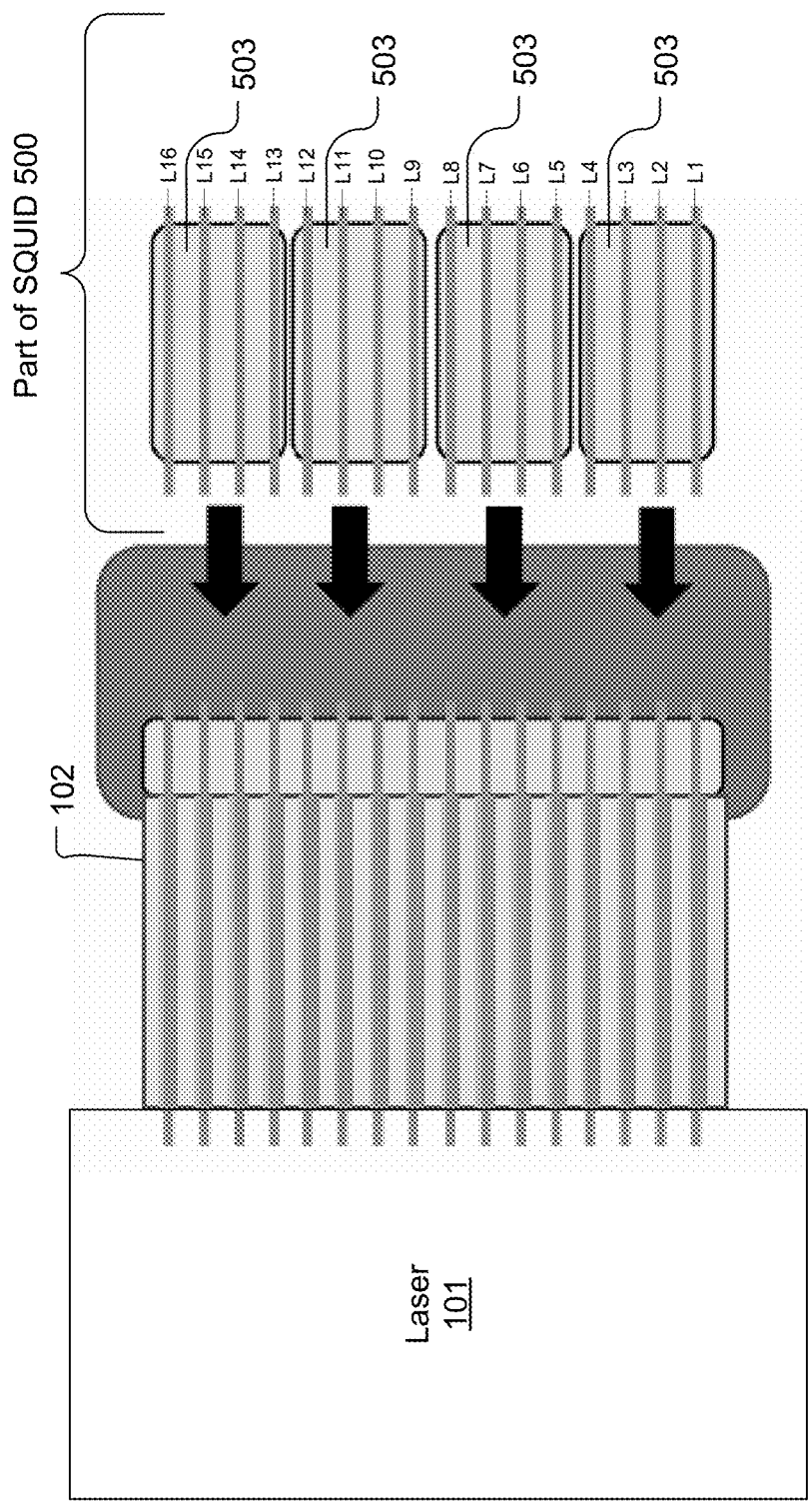
FIG. 7 shows a diagram of how the SQUID assembly can be connected to the laser light supply system, in accordance with some embodiments.

FIG. 7 shows a diagram of how the SQUID assembly 500 can be connected to the laser light supply system 101, in accordance with some embodiments. In some embodiments, the connector 503 of the SQUID assembly 500 is configured to match the output interface 102 of the laser light supply system 101 to facilitate connecting to the laser light supply system 101 during assembly of the optical module 101, as well as to facilitate testing, repair, burn-in, etc. The connector 503 can be configured to include an array of short segments of optical fiber that are cleaved so that the pattern of the cleaved ends of the segments of optical fiber match the pattern of optical coupling sites in the output interface 102 of the laser light supply system 101. In some embodiments, the connector 503 can include an array of grooves or channels, such as "V" grooves, to facilitate arrangement of the optical fibers within the connector 503 to enable matching of the optical fibers with the pattern of optical coupling sites in the output interface 102 of the laser light supply system 101.

In some embodiments, ends of the optical fibers that extend from the connector 503 for interfacing with the output interface 102 of the laser light supply system 101 can be formed by cleaving or otherwise cutting the optical fibers after the optical fibers have been fixed in position relative to each other in the grooves or channel or ribbon within the connector 503, so that the relative axial cleave positions of the optical fibers can be passively and precisely controlled and maintained. In some embodiments, the output interface 102 of the laser light supply system 101 may not have vertical optical couplers. In such embodiments, the connector 503 can be configured to match an array of edge-coupling sites within the output interface 102 of the laser light supply system 101.

In some embodiments, the end of the optical fiber that extends from the connector 503 for interfacing with the output interface 102 of the laser light supply system 101 will have an end surface that is substantially normal to the axis of the optical fiber. In some embodiments, the end surface of the optical fiber that extends from the connector 503 can be slightly, e.g., less than 15 degrees, off-normal relative to the axis of the optical fiber in order to reduce back-reflections. In some embodiments, the end surface of the optical fiber that extends from the connector 503 can end in a prism or a larger-angle cleave to provide for turning of the laser beam, such as when an interposer is used to subsequently redirect the laser beam.

In some embodiments, the connector 503 is configured to connect directly with a semiconductor chip that includes the gain medium of the laser light supply system 101. Or, in some embodiments, there may be intermediate components located between the connector 503 and the gain medium of the laser light supply system 101. For example, an interposer, a semiconductor amplifier, a fiber amplifier, and/or an external cavity can be positioned between the connector 503 and the gain medium of the laser light supply system 101. Also, in various embodiments, the connector 503 is configured in a way that provides for easy connection with one or more PMF ribbons or polarization-maintaining microcables which will connect the laser light supply system 101 to the chips 103A-103D. In some embodiments, these PMF ribbons or polarization-maintaining microcables may be part of the SQUID assembly 500.

Figure 8:
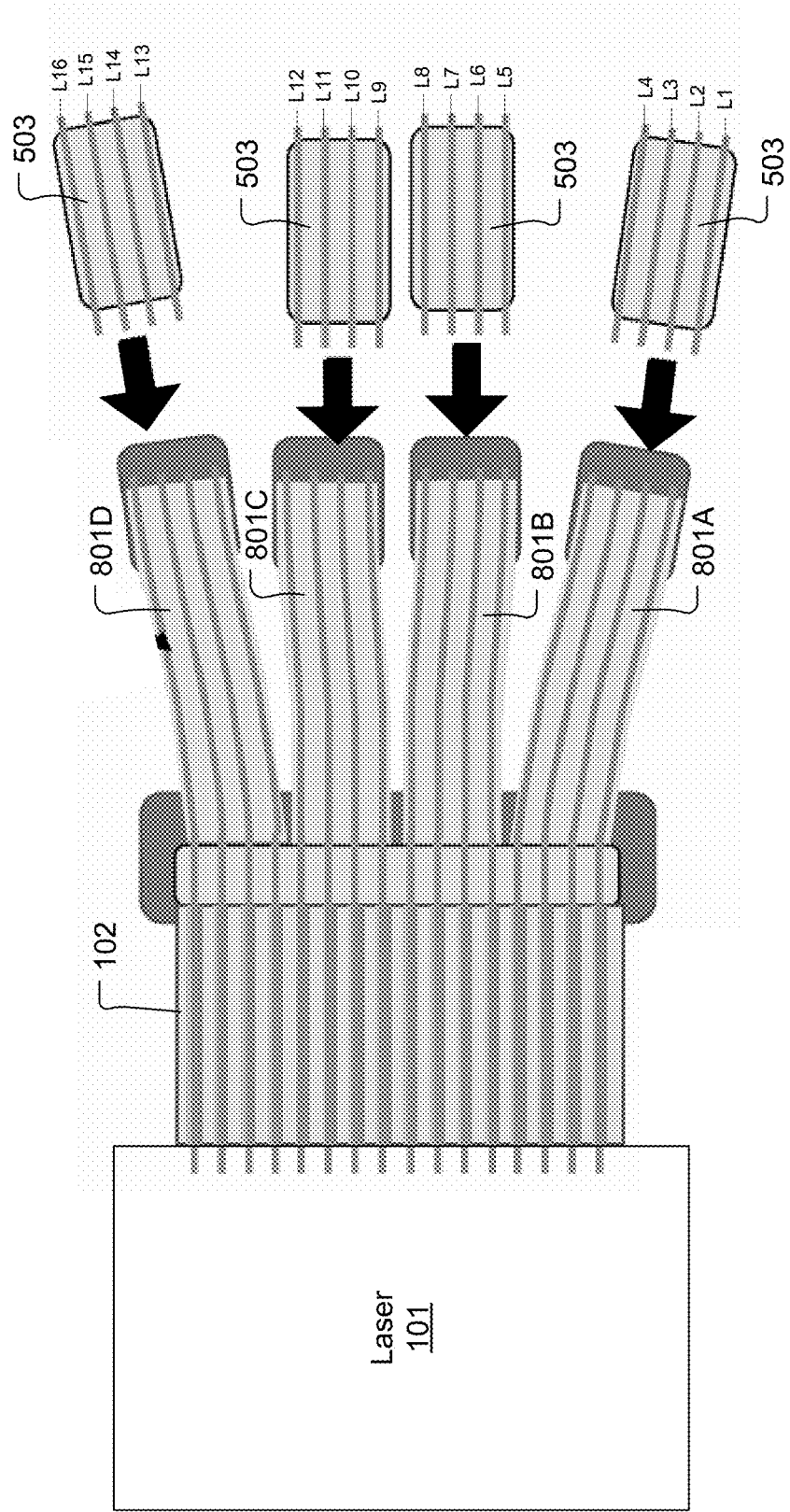
FIG. 8 shows the diagram of FIG. 7, with four breakout assemblies provided to connect the four connectors to the output interface of the laser light supply system, in accordance with some embodiments.

In some embodiments, the connector 503 is configured so that multiple PMF ribbons and/or polarization-maintaining microcables can plug into immediately adjacent positions along a standard connector within the output interface 102 of the laser light supply system 101. However, in some embodiments, the connector 503 is configured so that multiple PMF ribbons and/or polarization-maintaining microcables may not plug into immediately adjacent positions along a standard connector within the output interface 102 of the laser light supply system 101. In these embodiments, a breakout assembly can be provided to optically connect the connector 503 to the output interface 102 of the laser light supply system 101. FIG. 8 shows the diagram of FIG. 7, with four breakout assemblies 801A, 801B, 801C, 801D provided to connect the four connectors 503 to the output interface 102 of the laser light supply system 101, in accordance with some embodiments. Each of the breakout assemblies 801A-801D is configured as an optical extension that includes a number of optical fibers and/or optical waveguides that match in number and polarization alignment with optical fibers within the connector 503 and with optical coupling sites within the output interface 102 of the laser light supply system 101. The breakout assemblies 801A-801D provide for fan-out of the optical coupling sites within the output interface 102 of the laser light supply system 101 to enable easier connection of the connectors 503 to the output interface 102, and to enable connection/removal of one connector 503 to/from the output interface 102 without disturbing connection of another connector 503 with the output interface 102.

Figure 9A:
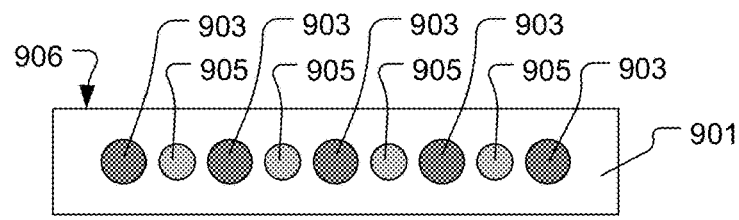
FIG. 9A shows an example vertical cross-section through one type of PMF ribbon, in accordance with some embodiments.

As discussed above, in some embodiments, the SQUID assembly 500 can include a PMF ribbon 507 or polarization-maintaining multicore optical fiber for optically connecting the laser light supply system 101 to the chip 103A-103D. FIG. 9A shows an example vertical cross-section through one type of PMF ribbon 901, in accordance with some embodiments. The PMF ribbon 901 includes multiple optical cores 905 arranged in a substantially linear alignment with each other. The PMF ribbon 901 also includes stress-inducing members 903 that are substantially linear aligned with the multiple optical cores 905, such that each optical core 905 is bracketed by a pair of stress-inducing members 903 in a substantially similar spatial configuration. The stress-inducing members 903 function to introduce birefringence within the multiple optical cores 905, such that each of the optical cores 905 has a substantially same polarization alignment. The body of the PMF ribbon 901 is configured to maintain the linear arrangement of the multiple optical cores 905 and stress-inducing members 903 along the length of the PMF ribbon 901.

Also, the PMF ribbon 901 can include a flat outer surface 906 to facilitate alignment of the PMF ribbon 901 with a matching optical connector. In some embodiments, with the multiple cores 905 arranged in a line, the birefringence axis of all cores 905, and the alignment feature (flat outer surface 906), and the displacement between cores 905 all have the same direction. The perpendicular distance between the flat outer surface 906 and the center of the optical cores 905 can be controlled to be small enough to allow improved optical coupling efficiency and to be large enough that light losses due to unwanted interaction with the chip surface are negligible. In some embodiments, the perpendicular distance between the flat outer surface 906 and the center of the optical cores 905 can be controlled at less than about 62 micrometers to enable efficient optical coupling even if an angled turning element in the optical coupling configuration has no graded-index or focusing portion. The flat outer surface 906 can enable orientation of the birefringent axes without the need to adjust the orientation of the birefringent axes using optical feedback. In some embodiments, the outer cladding/jacket of the PMF ribbon 901 can have a high aspect ratio that enables easy orientation and alignment of the PMF ribbon 901 with a connector or interface structure. It should be understood that the birefringent axis of each core 905 of PMF ribbon 901 is determined by the birefringence-inducing perturbations, such as stress-inducing members 903 (e.g., stress rods or the like), so that controlling the orientation of the PMF ribbon 901 alone provides sufficiently polarization-maintaining connectivity.

Figure 9B:
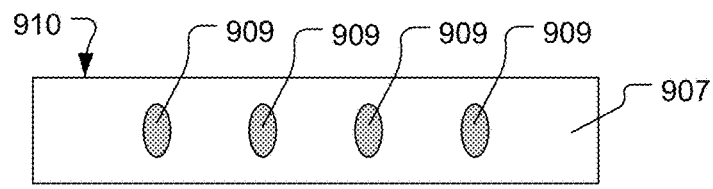
FIG. 9B shows an example vertical cross-section through another type of PMF ribbon, in accordance with some embodiments.

FIG. 9B shows an example vertical cross-section through another type of PMF ribbon 907, in accordance with some embodiments. The PMF ribbon 907 includes multiple optical cores 909, where each core 909 has an elliptical cross-sectional shape that creates inherent birefringence within the core 909. In some embodiments, the multiple optical cores 909 are arranged in a substantially linear alignment with each other. The body of the PMF ribbon 907 is configured to maintain the linear arrangement of the multiple optical cores 909 along the length of the PMF ribbon 907. Also, the PMF ribbon 907 can include a flat outer surface 910 to facilitate alignment of the PMF ribbon 907 with a matching optical connector. In some embodiments, the spatial relationship of the flat outer surface 910 is correlated to the birefringence orientation of the multiple cores 909, so that positioning of the flat outer surface 910 will reliably control the birefringence orientation of the multiple cores 909. The perpendicular distance between the flat outer surface 910 and the center of the optical cores 909 can be controlled to be small enough to allow improved optical coupling efficiency and to be large enough that light losses due to unwanted interaction with the chip surface are negligible. In some embodiments, the perpendicular distance between the flat outer surface 910 and the center of the optical cores 909 can be controlled at less than about 62 micrometers to enable efficient optical coupling even if an angled turning element in the optical coupling configuration has no graded-index or focusing portion. The flat outer surface 910 can enable orientation of the birefringent axes without the need to adjust the orientation of the birefringent axes using optical feedback. In some embodiments, the outer cladding/jacket of the PMF ribbon 907 can have a high aspect ratio that enables easy orientation and alignment of the PMF ribbon 907 with a connector or interface structure. It should be understood that the birefringent axis of each core 909 of PMF ribbon 907 is determined by the birefringence-inducing elliptical shape of the cores 909, so that controlling the orientation of the PMF ribbon 907 alone provides sufficiently polarization-maintaining connectivity.

Figure 9C:
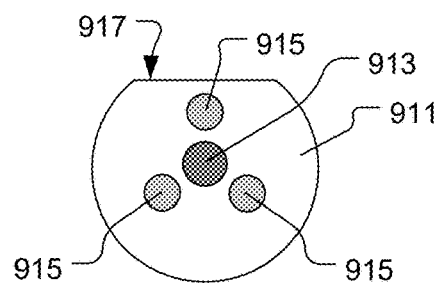
FIG. 9C shows an example vertical cross-section through a polarization-maintaining multicore optical fiber (PMMF), in accordance with some embodiments.

FIG. 9C shows an example vertical cross-section through a polarization-maintaining multicore optical fiber (PMMF) 911, in accordance with some embodiments. In the PMMF 911, three optical cores 915 are symmetrically positioned around a central stress-inducing member 913, such as a stress rod or the like. The stress-inducing member 913 functions to introduce birefringence within the multiple optical cores 915, such that the birefringent axes of the optical cores 915 are radially directed about the stress-inducing member 913. The body of the PMMF 911 is configured to maintain the arrangement of the multiple optical cores 915 and stress-inducing member 913 along the length of the PMMF 911. Also, the PMMF 911 can include a flat outer surface 917 to facilitate alignment of the PMMF 911 with a matching optical connector. In some embodiments, the spatial relationship of the flat outer surface 917 is correlated to the birefringence orientations of the multiple cores 915, so that positioning of the flat outer surface 917 will reliably control the birefringence orientations of the multiple cores 915. The flat outer surface 917 can enable orientation of the birefringent axes of the multiple cores 915 without the need to adjust the orientation of the birefringent axes using optical feedback.

Figure 9D:
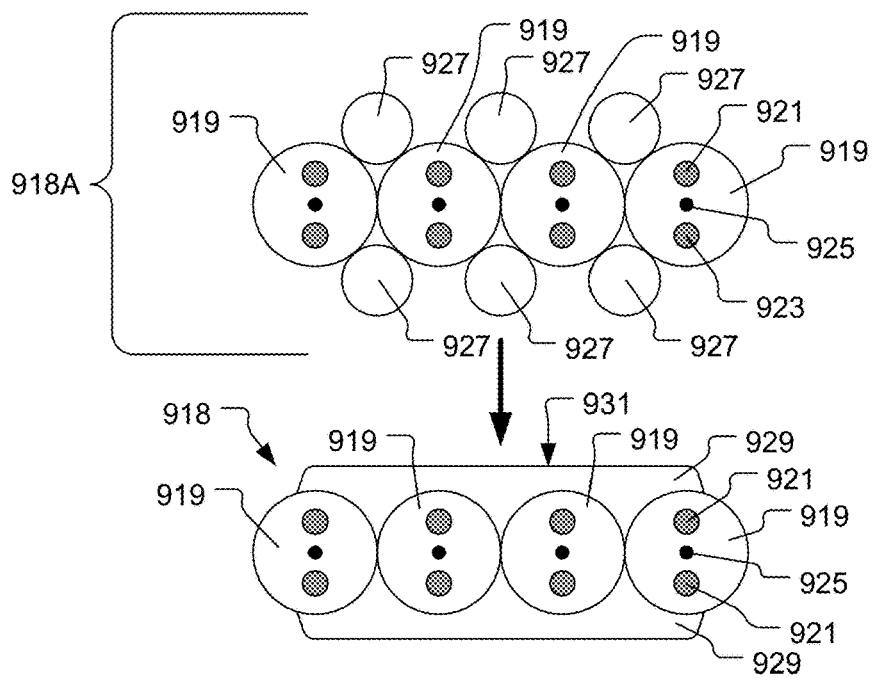
FIG. 9D shows an example vertical cross-section through another type of PMF ribbon, in accordance with some embodiments.

FIG. 9D shows an example vertical cross-section through another type of PMF ribbon 918, in accordance with some embodiments. FIG. 9D also shows a preform 918A of the PMF ribbon 918, before the preform 918A is drawn to create the PMF ribbon 918. The preform 918A includes a number of PMF's 919 positioned in a substantially linearly aligned configuration. The preform 918A also includes a number of alignment components 927 positioned at top and bottom interfaced between adjacently positioned PMF's 919. Each PMF 919 includes an optical core 925 and stress-inducing members 921 to created birefringence in the optical core 925. The PMF's 919 are axially aligned so that the birefringent axis of each PMF 919 is aligned in the same direction. The PMF's 919 shown in the example of FIG. 9D are PANDA-type PMF's 919. However, it should be understood that in other embodiments, the PMF's 919 can be other types of PMF's, such as bow-tie-type PMF's 919, among others. As the preform 918A is drawn to produce the PMF ribbon 918, the alignment components 927 flow to substantially fill interstitial spacings between the PMF's 919 and then solidify to form an outer cladding 929 that physically secures the PMF's 919 in their linear arrangement with respect to each other. Also, drawing of the preform 918A to create the PMF ribbon 918 can be done to form one or more alignment features on the exterior surface of the PMF ribbon 918. In the example of FIG. 9D, the preform 918A is drawn to create the PMF ribbon 918 having an alignment feature that is a flat surface 931 on the outside of the PMF ribbon 918. It should be appreciated that the flat surface 931 on the outside of the PMF ribbon 918 can be formed without polishing. Also, it should be understood that in other embodiments, the alignment feature(s) on the exterior surface of the PMF ribbon 918 can have various cross-sectional shapes, such as grooves or channels.

The flat outer surface 931 can facilitate alignment of the PMF ribbon 918 with a matching optical connector. In some embodiments, the spatial relationship of the flat outer surface 931 is correlated to the birefringence orientation of the multiple cores 925, so that positioning of the flat outer surface 931 will reliably control the birefringence orientation of the multiple cores 925. The perpendicular distance between the flat outer surface 931 and the center of the optical cores 925 can be controlled to be small enough to allow improved optical coupling efficiency and to be large enough that light losses due to unwanted interaction with the chip surface are negligible. In some embodiments, the perpendicular distance between the flat outer surface 931 and the center of the optical cores 925 can be controlled at less than about 62 micrometers to enable efficient optical coupling even if an angled turning element in the optical coupling configuration has no graded-index or focusing portion. The flat outer surface 931 can enable orientation of the birefringent axes without the need to adjust the orientation of the birefringent axes using optical feedback. In some embodiments, the outer cladding 929 of the PMF ribbon 918 can have a high aspect ratio that enables easy orientation and alignment of the PMF ribbon 918 with a connector or interface structure.

In some embodiments, the preform 918A for the PMF ribbon 918 may be configured without use of pre-manufactured PMF's 919. More specifically, the preform 918A can be configured to include cladding materials (similar to the alignment components 927), optical core elements, and birefringence-inducing members, as well as possible voids used to obtain controlled deformations. The stress induced by the birefringence-inducing members can be controlled by selecting materials with large differences in thermal expansion (e.g., Boron-doped silica). The preform 918A may be produced through a combination of machining (e.g., drilling holes), stacking, overcladding, and other processes.

Figure 10:
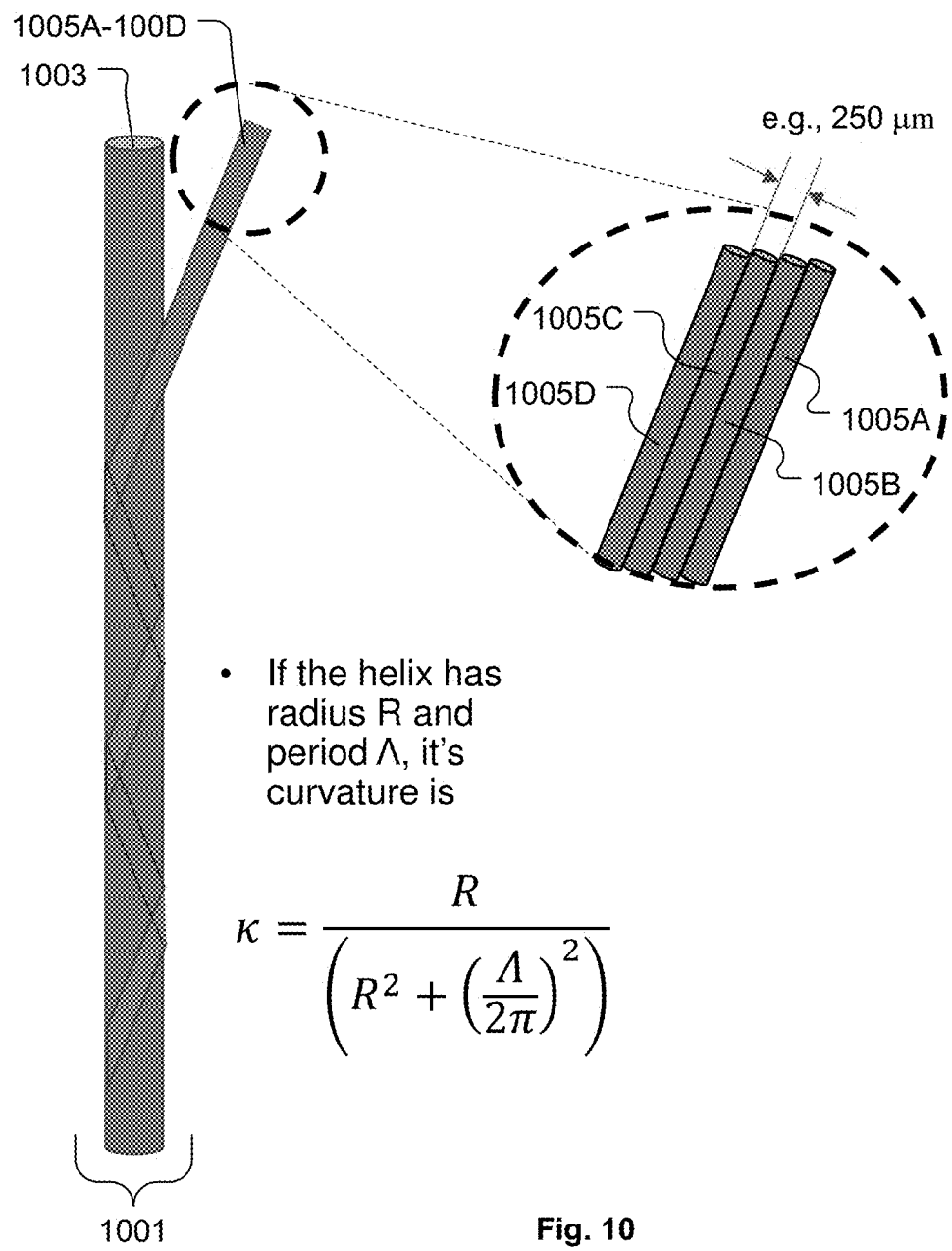
FIG. 10 shows an example of a quasi-polarization maintaining optical fiber assembly (QPMFA), in accordance with some embodiments.

FIG. 10 shows an example of a quasi-polarization maintaining optical fiber assembly (QPMFA) 1001, in accordance with some embodiments. The QPMFA 1001 is formed by wrapping a number of SMF's 1005A, 1005B, 1005C, 1005D around a form (or filament) 1003 so that controlled birefringence is introduced into the multiple SMF's 1005A-1005D. It should be understood that the inclusion of four SMF's 1005A-1005D in the QPMFA 1001 is shown by way of example. In various embodiments, the QPMFA 1001 can include either less than four SMF's or more than four SMF's. The multiple SMF's 1005A-1005D are around the form 1003 in a controlled manner to create a helix of the multiple SMF's 1005A-1005D. The curvature of the helix of the multiple SMF's 1005A-1005D is correlated to the birefringence that is introduced into the multiple SMF's 1005A-1005D. The curvature (κ) of the helix of the multiple SMF's 1005A-1005D is given by Equation 1, where (R) is the radius of the helix and (Λ) is the period of the helix.

$$\kappa = \frac{R}{\left(R^2 + \left(\frac{\Lambda}{2\pi}\right)^2\right)}. \qquad \text{Equation 1}$$

In some embodiments, the helix of the multiple SMF's 1005A-1005D is formed by wrapping a ribbon of the SMF's 1005A-1005D (or non-polarization-maintaining fibers) around form 1003 so that the ribbon of the SMF's 1005A-1005D has a substantial bend-induced birefringence along a known bend axis relative to the ribbon of the SMF's 1005A-1005D. As shown in Equation 1, the local curvature (κ) is related to the helix period (Λ) and the helix radius (R), which can be controlled by appropriately selecting a form 1003 and wrapping parameters for the SMF's 1005A-1005D around the form 1003. In various embodiments, the SMF's 1005A-1005D can be bound to the form 1003 using an adhesive and/or by enclosing them in a jacket material. In some embodiments, a multi-core optical fiber with elongated cladding can be used instead of the ribbon of SMF's 1005A-1005D.

In some embodiments, an SMF ribbon can be produced and attached to a curled cable support element that is flexible enough to use for routing, but that tends to assume a helical shape. In these embodiments, the SMF fiber ribbon can be bonded to the curled cable support element by adhesion, or enclosed within it, or both the SMF fiber ribbon and the curled cable support element can be enclosed in a jacket material.

Figure 11:
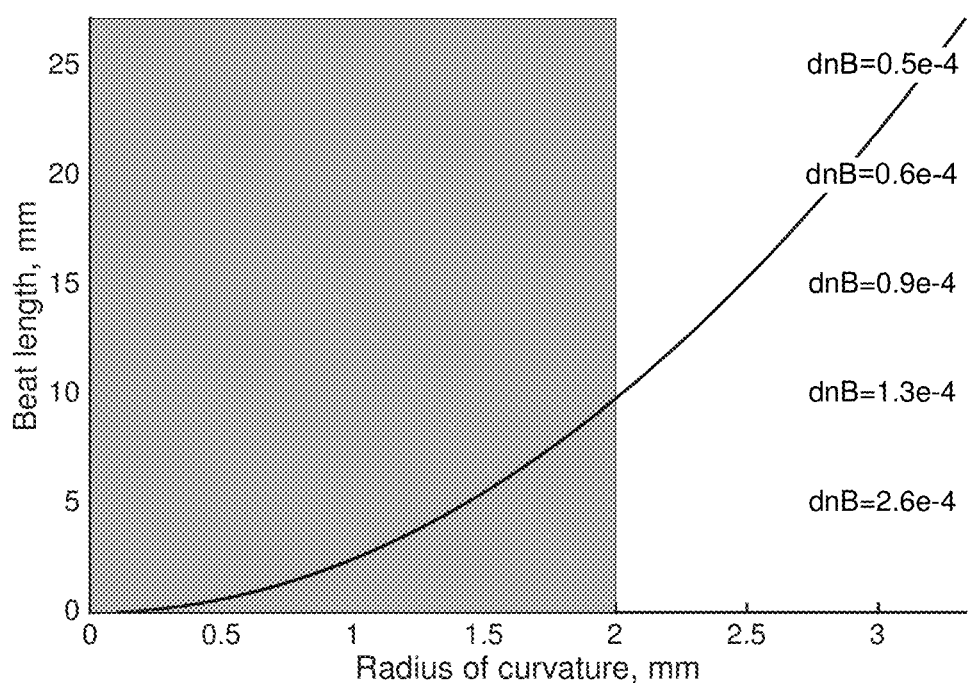
FIG. 11 shows a plot of birefringence (beat length) as a function of radius of curvature of SMF fiber, in accordance with some embodiments.

An amount of achievable birefringence is limited by fiber breakage. In some embodiments, the bend diameter of the SMF fibers about the form 1003 is greater than or equal to about 4 millimeters. FIG. 11 shows a plot of birefringence (beat length) as a function of radius of curvature of SMF fiber, in accordance with some embodiments. FIG. 11 shows that birefringence of around dnB=1.3e-4 (beat length of about 1 centimeter) can be achieved for SMF fiber bend diameters greater than or equal to about 4 millimeters (radius of curvature of SMF fiber greater than or equal to about 2 millimeters). Therefore, a regime of quasi-polarization-maintaining operation is achievable in SMF fiber by controlled bending of the SMF fiber. In some embodiments, the QPMFA 1001 is configured to ensure that the local SMF fiber 1005A-1005B bend diameter remains greater than or equal to about 4 millimeters at each location along the length of the form 1003. In an example embodiment, the QPMFA 1001 is configured to have a radius (R) of the helix equal to about 2 millimeters, and a period (Λ) of the helix equal to about 2 millimeters. In this example embodiment, about 6 centimeters of the SMF's 1005A-1005B is needed to transport light about 1 centimeter along the form 1003. In another example embodiment, the QPMFA 1001 is configured to have a radius (R) of the helix equal to about 1.5 millimeters, and a period (Λ) of the helix equal to about 6 millimeters. In this example embodiment, about 1.9 centimeters of the SMF's 1005A-1005B is needed to transport light about 1 centimeter along the form 1003. It should be understood that the above-mentioned values for the radius (R) of the helix and the period (Λ) of the helix are provided by way of example. In various embodiments, the radius (R) of the helix and the period (Λ) of the helix can be defined as needed to create the QPMFA 1001.

In some embodiments, an optical module (e.g., 100) is disclosed. The optical module (e.g., 100) can include a housing or exterior structure. In some embodiments, the optical module (e.g., 100) can also include a laser light supply system (e.g., 101) disposed within the housing. In other embodiments, the laser light supply system (e.g., 101) can be disposed outside of the housing of the optical module (e.g., 100). The laser light supply system (e.g., 101) has a laser output optical port. A chip (e.g., 103A-103D) is disposed within the housing of the optical module (e.g., 100). The chip (e.g., 103A-103D) includes a laser input optical port (e.g., 207), and a transmit data optical port (e.g., 209), and a receive data optical port (e.g., 211). The optical module (e.g., 100) also includes a link-fiber interface exposed at an exterior surface of the housing. The link-fiber interface includes a transmit data connector (e.g., T) and a receive data connector (e.g., R). The optical module (e.g., 100) also includes a polarization-maintaining optical fiber (e.g., 201) optically connected between the laser output optical port and the laser input optical port (e.g., 107) of the chip (e.g., 103A-103D). The optical module (e.g., 100) also includes a first non-polarization-maintaining optical fiber (e.g., 203) optically connected between the transmit data optical port (e.g., 209) of the chip (e.g., 103A-103D) and the transmit data connector (T) of the link-fiber interface. The optical module (e.g., 100) also includes a second non-polarization-maintaining optical fiber (e.g., 205) optically connected between the receive data optical port (e.g., 211) of the chip (e.g., 103A-103D) and the receive data connector (R) of the link-fiber interface.

In some embodiments, a chip connector (e.g., 104A-104D) is configured to direct light output from the polarization-maintaining optical fiber (e.g., 201) into the laser input optical port (e.g., 207) of the chip (e.g., 103A-103D). The chip connector (e.g., 104A-104D) is configured to direct light output from the transmit data optical port (e.g., 209) of the chip (e.g., 103A-103D) into the first non-polarization-maintaining optical fiber (e.g., 203). The chip connector (e.g., 104A-104D) is also configured to direct light output from the second non-polarization-maintaining optical fiber (e.g., 205) into the receive data optical port (e.g., 211) of the chip (e.g., 103A-103D). In some embodiments, the chip connector (e.g., 104A-104D) is configured to turn the laser light between the output from the polarization-maintaining optical fiber (e.g., 201) and the laser input optical port (e.g., 207) of the chip (e.g., 103A-103D). Also, in some embodiments, the chip connector (e.g., 104A-104D) is configured to turn the light output from the transmit data optical port (e.g., 209) of the chip (e.g., 103A-103D) between the transmit data optical port (e.g., 209) of the chip (e.g., 103A-103D) and the first non-polarization-maintaining optical fiber (e.g., 203). In some embodiments, the chip connector (e.g., 104A-104D) is configured to turn the light output from the second non-polarization-maintaining optical fiber (e.g., 205) between the second non-polarization-maintaining optical fiber (e.g., 205) and the receive data optical port (e.g., 211) of the chip (e.g., 103A-103D). In some embodiments, a laser connector (e.g., 102) is configured to direct laser light output from the laser light supply system (e.g., 101) to the polarization-maintaining optical fiber (e.g., 201). In some embodiments, the laser connector (e.g., 102) is configured to turn the laser light between the laser output optical port of the laser light supply system (e.g., 101) and the polarization-maintaining optical fiber (e.g., 201).

In some embodiments, the laser light supply system (e.g., 101) has multiple laser output optical ports, and the chip (e.g., 103A-103D) has multiple laser input optical ports (e.g., 207), and the chip (e.g., 103A-103D) has a separate transmit data optical port (e.g., 209) for each of the multiple laser input optical ports of the laser light supply system (e.g., 101), and the chip (e.g., 103A-103D) has a separate receive data optical port (e.g., 211) for each of the multiple laser input optical ports of the laser light supply system (e.g., 101). In this manner, the chip (e.g., 103A-103D) has a separate fiber set 200 for each of the multiple laser input optical ports of the laser light supply system (e.g., 101). Also, in some embodiments, the link-fiber interface includes a separate transmit data connector (e.g., T) for each transmit data optical port (e.g., 209) of the chip (e.g., 103A-103D). Also, the link-fiber interface includes a separate receive data connector (e.g., R) for each receive data optical port (e.g., 211) of the chip (e.g., 103A-103D). Additionally, each laser output optical port is optically connected to a corresponding one of the multiple laser input optical ports (e.g., 207) of chip (e.g., 103A-103D) through a separate polarization-maintaining optical fiber (e.g., 201). And, each transmit data optical port (e.g., 209) is connected to a corresponding transmit data connector (e.g., T) of the link-fiber interface through a separate non-polarization-maintaining optical fiber (e.g., 203). And, each receive data optical port (e.g., 211) is connected to a corresponding receive data connector (e.g., R) of the link-fiber interface through a separate non-polarization-maintaining optical fiber (e.g., 205).

In some embodiments, the multiple laser output optical ports include four laser output optical ports. And, the multiple laser input optical ports (e.g., 207) of a given chip (e.g., 103A-103D) include four laser input optical ports (e.g., 207), such as shown in FIG. 3. And, the chip (e.g., 103A-103D) includes four transmit data optical ports (e.g., 209), such as shown in FIG. 3. And, the chip (e.g., 103A-103D) includes four receive data optical ports (e.g., 211), such as shown in FIG. 3. And, the link-fiber interface includes four transmit data connectors (e.g., T) four receive data connectors (e.g., R) for each chip (e.g., 103A-103D).

In some embodiments, the chip (e.g., 103A-103D) is one of multiple chips within the optical module (e.g., 100). And, each of the multiple chips (e.g., 103A-103D) includes multiple laser input optical ports (e.g., 207). And, each of the multiple chips (e.g., 103A-103D) includes multiple transmit data optical ports (e.g., 209), such that a given chip has a separate transmit data optical port (e.g., 209) for each of the multiple laser input optical ports (e.g., 207) of the given chip (e.g., 103A-103D). Also, each of the multiple chips (e.g., 103A-103D) includes multiple receive data optical ports (e.g., 211), such that a given chip (e.g., 103A-103D) has a separate receive data optical port (e.g., 211) for each of the multiple laser input optical ports (e.g., 207) of the given chip (e.g., 103A-103D). Also, the laser light supply system (e.g., 101) can include a separate laser output optical port for each of the laser input optical ports (e.g., 207) of the multiple chips (e.g., 103A-103D) within the optical module (e.g., 100). Also, the link-fiber interface of the optical module (e.g., 100) can include a separate transmit data connector (e.g., T) for each transmit data optical port (e.g., 209) of the multiple chips (e.g., 103A-103D). And, the link-fiber interface can include a separate receive data connector (e.g., R) for each receive data optical port (e.g., 211) of the multiple chips (e.g., 103A-103D). Also, each laser output optical port is optically connected to a corresponding one of the laser input optical ports (e.g., 207) of the multiple chips (e.g., 103A-103D) through a separate polarization-maintaining optical fiber (e.g., 201). And, each transmit data optical port (e.g., 209) of the multiple chips (e.g., 103A-103D) is connected to a corresponding transmit data connector (e.g., T) of the link-fiber interface through a separate non-polarization-maintaining optical fiber (e.g., 203). And, each receive data optical port (e.g., 211) of the multiple chips (e.g., 103A-103D) is connected to a corresponding receive data connector (e.g., R) of the link-fiber interface through a separate non-polarization-maintaining optical fiber (e.g., 205).

In some embodiments, the optical module (e.g., 100) includes a separate set of polarization-maintaining optical fibers (e.g., L1-L4, or L5-L8, or L9-L12, or L13-L16) for each of the multiple chips (e.g., 103A-103D), where a given set of polarization-maintaining optical fibers (e.g., L1-L4, or L5-L8, or L9-L12, or L13-L16) is disposed to optically connect the multiple laser input optical ports (e.g., 207) of a given chip (e.g., 103A-103D) to corresponding multiple laser output optical ports of the laser light supply system (e.g., 101). In some embodiments, the given set of polarization-maintaining optical fibers (e.g., L1-L4, or L5-L8, or L9-L12, or L13-L16) is configured in a polarization-maintaining optical fiber ribbon. The polarization-maintaining optical fiber ribbon is configured to maintain a same polarization alignment for each polarization-maintaining optical fiber (e.g., 201) within the given set of polarization-maintaining optical fibers (e.g., L1-L4, or L5-L8, or L9-L12, or L13-L16). In some embodiments, the same polarization alignment is spatially correlated to an alignment surface on an exterior of the polarization-maintaining optical fiber ribbon. In some embodiments, a chip connector (e.g., 501) is configured to direct light output from each polarization-maintaining optical fiber (e.g., 201) into a corresponding laser input optical port (e.g., 207) of a given chip of the multiple chips (e.g., 103A-103D), where the chip connector (e.g., 501) is optically connected to an end of the polarization-maintaining optical fiber ribbon. In some embodiments, a laser connector (e.g., 503) is configured to direct laser light output from separate laser output optical ports of the laser light supply system (e.g., 101) into corresponding separate polarization-maintaining optical fibers (e.g., 201) within the polarization-maintaining optical fiber ribbon, where the laser connector (e.g., 503) is optically connected to a first end of the polarization-maintaining optical fiber ribbon, and where the chip connector (e.g., 501) is optically connected to a second end of the polarization-maintaining optical fiber ribbon. In some embodiments, the laser connector (e.g., 503) is optically connected to multiple separate polarization-maintaining optical fiber ribbons.

In some embodiments, the chip connector (e.g., 104A-104D) is configured to direct light output from each the transmit data optical ports (e.g., 209) of the given chip (e.g., 103A-103D) into a corresponding non-polarization-maintaining optical fiber (e.g., 203) that is optically connected to a corresponding transmit data connector (e.g., T) of the link-fiber interface. And, the chip connector (e.g., 104A-104D) is configured to direct light into the receive data optical port (e.g., 211) of the given chip (e.g., 103A-103D) from a corresponding non-polarization-maintaining optical fiber (e.g., 205) that is optically connected to a corresponding receive data connector (e.g., R) of the link-fiber interface. In some embodiments, the corresponding non-polarization-maintaining optical fiber (e.g., 203) that is optically connected to the corresponding transmit data connector (e.g., T) of the link-fiber interface and the corresponding non-polarization-maintaining optical fiber (e.g., 205) that is optically connected to the corresponding receive data connector (e.g., R) of the link-fiber interface are co-located within a multiple non-polarization-maintaining optical fiber structure. In some embodiments, each of the multiple chips (e.g., 103A-103D) includes four laser input optical ports (e.g., 207), such as shown in FIG. 3. And, the given set of polarization-maintaining optical fibers (e.g., 201) includes four polarization-maintaining optical fibers (e.g., L1-L4, or L5-L8, or L9-L12, or L13-L16). Also, in some embodiments, the multiple chips within the optical module (e.g., 100) includes four chips (e.g., 103A-103D).

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in other embodiments, even if not specifically shown or described. Such variations of the example embodiments disclosed herein are not to be regarded as a departure from the invention, and all such modifications are intended to be included within the scope of the invention.

Although the foregoing invention has been described in some detail for purposes of clarity of understanding, it will be apparent that certain changes and modifications can be practiced within the scope of the invention description. Accordingly, the example embodiments disclosed herein are to be considered as illustrative and not restrictive, and the invention is not to be limited to the details given herein, but may be modified within the scope and equivalents of the described embodiments.

What is claimed is:

1. An optical module, comprising:
   a housing;
   a laser light supply system disposed within the housing, the laser light supply system having a laser output optical port;
   a chip disposed within the housing, the chip having a laser input optical port and a transmit data optical port and a receive data optical port;
   a link-fiber interface exposed at an exterior surface of the housing, the link-fiber interface including a transmit data connector and a receive data connector;
   a polarization-maintaining optical fiber optically connected between the laser output optical port and the laser input optical port of the chip;
   a first non-polarization-maintaining optical fiber optically connected between the transmit data optical port of the chip and the transmit data connector of the link-fiber interface; and
   a second non-polarization-maintaining optical fiber optically connected between the receive data optical port of the chip and the receive data connector of the link-fiber interface;
   a chip connector attached to the chip, the chip connector having one or more angled light turning elements, at least one of the one or more angled turning elements configured and positioned to re-direct light from the polarization-maintaining optical fiber into the laser input optical port of the chip, at least one of the one or more angled turning elements configured and positioned to re-direct light from the transmit data optical port of the chip into the first non-polarization-maintaining optical fiber, at least one of the one or more angled turning elements configured and positioned to re-direct light from the second non-polarization-maintaining optical fiber into the receive data optical port of the chip.

2. The optical module as recited in claim 1, further comprising:
   a laser connector configured to direct laser light output from the laser light supply system to the polarization-maintaining optical fiber.

3. The optical module as recited in claim 2, wherein the laser connector is configured to turn the laser light between the laser output optical port and the polarization-maintaining optical fiber.

4. The optical module as recited in claim 1, wherein the laser light supply system has multiple laser output optical ports,
   wherein the chip has multiple laser input optical ports,
   wherein the chip has a separate transmit data optical port for each of the multiple laser input optical ports,
   wherein the chip has a separate receive data optical port for each of the multiple laser input optical ports,
   wherein the link-fiber interface includes a separate transmit data connector for each transmit data optical port of the chip,
   wherein the link-fiber interface includes a separate receive data connector for each receive data optical port of the chip,
   wherein each laser output optical port is optically connected to a corresponding one of the multiple laser input optical ports of chip through a separate polarization-maintaining optical fiber,
   wherein each transmit data optical port is connected to a corresponding transmit data connector of the link-fiber interface through a separate non-polarization-maintaining optical fiber, and
   wherein each receive data optical port is connected to a corresponding receive data connector of the link-fiber interface through a separate non-polarization-maintaining optical fiber.

5. The optical module as recited in claim 4, wherein the multiple laser output optical ports include four laser output optical ports, and wherein the multiple laser input optical ports include four laser input optical ports, and wherein the chip includes four transmit data optical ports, and wherein the chip includes four receive data optical ports, and wherein the link-fiber interface includes four transmit data connectors, and wherein the link-fiber interface includes four receive data connectors.

6. An optical module, comprising:
   a housing;
   a laser light supply system disposed within the housing, the laser light supply system having a laser output optical port;

a chip disposed within the housing, the chip having a laser input optical port and a transmit data optical port and a receive data optical port;

a link-fiber interface exposed at an exterior surface of the housing, the link-fiber interface including a transmit data connector and a receive data connector;

a polarization-maintaining optical fiber optically connected between the laser output optical port and the laser input optical port of the chip;

a first non-polarization-maintaining optical fiber optically connected between the transmit data optical port of the chip and the transmit data connector of the link-fiber interface; and a second non-polarization-maintaining optical fiber optically connected between the receive data optical port of the chip and the receive data connector of the link-fiber interface, wherein the chip is one of multiple chips within the optical module, each of the multiple chips including multiple laser input optical ports, each of the multiple chips including multiple transmit data optical ports such that a given chip has a separate transmit data optical port for each of the multiple laser input optical ports of the given chip, each of the multiple chips including multiple receive data optical ports such that a given chip has a separate receive data optical port for each of the multiple laser input optical ports of the given chip, wherein the laser light supply system includes a separate laser output optical port for each of the laser input optical ports of the multiple chips, wherein the link-fiber interface includes a separate transmit data connector for each transmit data optical port of the multiple chips, wherein the link-fiber interface includes a separate receive data connector for each receive data optical port of the multiple chips, wherein each laser output optical port is optically connected to a corresponding one of the laser input optical ports of the multiple chips through a separate polarization-maintaining optical fiber, wherein each transmit data optical port of the multiple chips is connected to a corresponding transmit data connector of the link-fiber interface through a separate non-polarization-maintaining optical fiber, and wherein each receive data optical port of the multiple chips is connected to a corresponding receive data connector of the link-fiber interface through a separate non-polarization-maintaining optical fiber.

7. The optical module as recited in claim 6, wherein the optical module includes a separate set of polarization-maintaining optical fibers for each of the multiple chips, wherein a given set of polarization-maintaining optical fibers is disposed to optically connect the multiple laser input optical ports of a given chip to corresponding multiple laser output optical ports of the laser light supply system.

8. The optical module as recited in claim 7, wherein the given set of polarization-maintaining optical fibers is configured in a polarization-maintaining optical fiber ribbon.

9. The optical module as recited in claim 8, wherein the polarization-maintaining optical fiber ribbon is configured to maintain a same polarization alignment for each polarization-maintaining optical fiber within the given set of polarization-maintaining optical fibers.

10. The optical module as recited in claim 9, wherein the same polarization alignment is spatially correlated to an alignment surface on an exterior of the polarization-maintaining optical fiber ribbon.

11. The optical module as recited in claim 10, further comprising:
a chip connector configured to direct light output from each polarization-maintaining optical fiber into a corresponding laser input optical port of a given chip of the multiple chips, wherein the chip connector is optically connected to an end of the polarization-maintaining optical fiber ribbon.

12. The optical module as recited in claim 11, further comprising:
a laser connector configured to direct laser light output from separate laser output optical ports of the laser light supply system into corresponding separate polarization-maintaining optical fibers within the polarization-maintaining optical fiber ribbon, wherein the laser connector is optically connected to a first end of the polarization-maintaining optical fiber ribbon, and wherein the chip connector is optically connected to a second end of the polarization-maintaining optical fiber ribbon.

13. The optical module as recited in claim 12, wherein the laser connector is optically connected to multiple separate polarization-maintaining optical fiber ribbons.

14. The optical module as recited in claim 12, wherein the chip connector is configured to direct light output from each the transmit data optical ports of the given chip into a corresponding non-polarization-maintaining optical fiber that is optically connected to a corresponding transmit data connector of the link-fiber interface, and wherein the chip connector is configured to direct light into the receive data optical port of the given chip from a corresponding non-polarization-maintaining optical fiber that is optically connected to a corresponding receive data connector of the link-fiber interface.

15. The optical module as recited in claim 14, wherein the corresponding non-polarization-maintaining optical fiber that is optically connected to the corresponding transmit data connector of the link-fiber interface and the corresponding non-polarization-maintaining optical fiber that is optically connected to the corresponding receive data connector of the link-fiber interface are co-located within a multiple non-polarization-maintaining optical fiber structure.

16. The optical module as recited in claim 15, wherein each of the multiple chips includes four laser input optical ports, and wherein the given set of polarization-maintaining optical fibers includes four polarization-maintaining optical fibers.

17. The optical module as recited in claim 16, wherein the multiple chips includes four chips.

18. The optical module as recited in claim 1, wherein the chip connector includes a plurality of grooves configured to align optical fibers to the chip, the plurality of grooves including a first groove for aligning the polarization-maintaining optical fiber to the chip, the plurality of grooves including a second groove for aligning the first non-polarization-maintaining optical fiber to the chip, the plurality of grooves including a third groove for aligning the second non-polarization-maintaining optical fiber to the chip.

19. The optical module as recited in claim 18, wherein the first groove is configured to provide for passive alignment of the polarization-maintaining optical fiber with the laser input optical port of the chip, wherein the second groove is configured to provide for passive alignment of the first non-polarization-maintaining optical fiber with the transmit data optical port of the chip, wherein the third groove is configured to provide passive alignment of the second non-polarization-maintaining optical fiber with the receive data optical port of the chip.

20. The optical module as recited in claim 18, wherein the plurality of grooves are configured as V-shaped grooves.

21. The optical module as recited in claim 18, wherein the plurality of grooves are oriented parallel with each other in a groove array.

22. The optical module as recited in claim 1, wherein the chip connector includes one or more focusing elements, at least one of the one or more focusing elements configured to focus re-directed light from the polarization-maintaining optical fiber onto the laser input optical port of the chip, at least one of the one or more focusing elements configured to focus re-directed light from the transmit data optical port onto an optical core of the first non-polarization-maintaining optical fiber, at least one of the one or more focusing elements configured to focus re-directed light from the second non-polarization-maintaining optical fiber onto the receive data optical port of the chip.

23. The optical module as recited in claim 1, wherein at least one of the angled light turning elements includes an angled reflecting surface.

24. The optical module as recited in claim 1, wherein the angled reflecting surface includes one or more coatings.

* * * * *